(12) United States Patent
Zhang et al.

(10) Patent No.: US 11,284,353 B2
(45) Date of Patent: Mar. 22, 2022

(54) UPLINK POWER CONTROL METHOD, APPARATUS AND STORAGE MEDIUM

(71) Applicant: ZTE CORPORATION, Shenzhen (CN)

(72) Inventors: Wen Zhang, Shenzhen (CN); Shuqiang Xia, Shenzhen (CN); Jing Shi, Shenzhen (CN); Xianghui Han, Shenzhen (CN); Chunli Liang, Shenzhen (CN); Wenfeng Zhang, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 530 days.

(21) Appl. No.: 16/325,048

(22) PCT Filed: Dec. 15, 2016

(86) PCT No.: PCT/CN2016/110192
§ 371 (c)(1),
(2) Date: Jul. 8, 2019

(87) PCT Pub. No.: WO2018/028104
PCT Pub. Date: Feb. 15, 2018

(65) Prior Publication Data
US 2021/0282090 A1    Sep. 9, 2021

(30) Foreign Application Priority Data
Aug. 12, 2016    (CN) .......................... 201610670240.1

(51) Int. Cl.
H04W 52/14    (2009.01)
H04L 1/00    (2006.01)
(Continued)

(52) U.S. Cl.
CPC ......... *H04W 52/146* (2013.01); *H04L 1/0003* (2013.01); *H04L 25/0226* (2013.01);
(Continued)

(58) Field of Classification Search
CPC . H04L 1/0003; H04L 25/0226; H04L 1/0029; H04W 52/146; H04W 52/365; H04W 52/242; H04W 52/42
See application file for complete search history.

(56) References Cited

U.S. PATENT DOCUMENTS 8,687,541 B2 * 4/2014 Lohr ..................... H04W 52/34
370/318
2008/0095110 A1 * 4/2008 Montojo ............... H04L 5/0017
370/330
(Continued)

FOREIGN PATENT DOCUMENTS

CN    101523795 A    9/2009
CN    102017693 A    4/2011
(Continued)

OTHER PUBLICATIONS

"Uplink Power Control"; 3GPP TSG RAN WG1 Meeting #84bis R1-162631 Busan, Korea, Apr. 11-15, 2016; Huawei et al. (Year: 2016).*
(Continued)

*Primary Examiner* — Benjamin H Elliott, IV
(74) *Attorney, Agent, or Firm* — Li & Cai Intellectual Property (USA) Office

(57) ABSTRACT

Provided by the present invention are an uplink power control method and apparatus, the method comprising: a UE side acquiring a power control parameter when an uplink channel is transmitted using one TTI length among multiple TTI lengths or an uplink channel is transmitted using one timing among multiple timings; and determining a transmis-
(Continued)

acquire a power control parameter by a UE side, when an uplink channel is transmitted with one of multiple TTI lengths, or an uplink channel is transmitted with one of multiple timings — S102 determine a transmission power of the uplink channel according to the power control parameter, wherein the uplink channel is a PUSCH or a PUCCH — S104 sion power of the uplink channel according to the power control parameter, the uplink channel being a physical uplink shared channel (PUSCH) or a physical uplink control channel (PUCCH). Thus, the problem of controlling uplink power using TTIs of different lengths which is present in existing technology may be solved by means of the steps in the present invention.

15 Claims, 6 Drawing Sheets

(51) Int. Cl.
*H04L 25/02* (2006.01)
*H04W 52/24* (2009.01)
*H04W 52/36* (2009.01)
*H04W 52/42* (2009.01)

(52) U.S. Cl.
CPC ....... *H04W 52/242* (2013.01); *H04W 52/365* (2013.01); *H04W 52/42* (2013.01)

(56) References Cited

U.S. PATENT DOCUMENTS

| | | | |
|---|---|---|---|
| 2009/0125363 A1* | 5/2009 | Frederiksen | H04W 72/1263 370/345 |
| 2011/0032894 A1* | 2/2011 | Miki | H04L 5/0053 370/329 |
| 2012/0057547 A1* | 3/2012 | Lohr | H04L 5/0064 370/329 |
| 2014/0153534 A1* | 6/2014 | Kim | H04W 52/146 370/329 |
| 2014/0269454 A1* | 9/2014 | Papasakellariou | H04L 5/14 370/280 |
| 2014/0301256 A1* | 10/2014 | Yao | H04W 52/325 370/280 |
| 2016/0029222 A1* | 1/2016 | Su | H04L 65/1069 370/329 |
| 2016/0112892 A1* | 4/2016 | Damnjanovic | H04W 72/0446 370/336 |
| 2016/0242125 A1* | 8/2016 | Lee | H04W 52/248 |
| 2017/0208554 A1* | 7/2017 | Hoshino | H04W 52/247 |
| 2017/0272200 A1* | 9/2017 | Dinan | H04L 5/0091 |
| 2017/0289970 A1* | 10/2017 | Yang | H04W 52/146 |
| 2017/0289985 A1* | 10/2017 | Yang | H04W 72/0406 |
| 2018/0146438 A1* | 5/2018 | Yl | H04L 1/18 |
| 2018/0160379 A1* | 6/2018 | Yokomakura | H04L 5/00 |
| 2018/0176938 A1* | 6/2018 | Shao | H04W 52/346 |
| 2018/0184426 A1* | 6/2018 | Li | H04W 72/0413 |
| 2018/0249428 A1* | 8/2018 | Huang | H04W 52/365 |
| 2018/0324716 A1* | 11/2018 | Jeon | H04W 52/367 |
| 2019/0174493 A1* | 6/2019 | Horiuchi | H04W 52/34 |
| 2019/0230600 A1* | 7/2019 | Gao | H04W 72/0446 |
| 2019/0253183 A1* | 8/2019 | Hao | H04W 72/044 |

FOREIGN PATENT DOCUMENTS

| | | |
|---|---|---|
| CN | 102415187 A | 4/2012 |
| CN | 105407524 A | 3/2016 |
| CN | 105827385 A | 8/2016 |
| WO | 2016061382 A1 | 4/2016 |

OTHER PUBLICATIONS

"Remaining issues on UL power control for NB-IoT"; 3GPP TSG RAN WG1 Meeting #84bis R1-162765 Busan, Korea, Apr. 11-15, 2016; ZTE (Year: 2016).*
China Patent Office, First Office Action dated Mar. 4, 2020 for application No. CN201610670240.1.
3GPP TS 36.213 V13.2.0 (Jun. 2016): "3rd Generation Partnership Project Technical Specification Group Radio Access Network Evolved Universal Terrestrial Radio Access (E-UTRA) Physical layer procedures (Release 13)," pp. 13-26, Jun. 30, 2016.
Samsung, "Study on specification impact for uplink due to TTI shortening," 3GPP TSG RAN WG1#83 R1-156822: , Nov. 7, 2015.
"3 Generation partnership Project; Technical Specification Group Radio Access Netwrok, Evolved Universal Terrestrial Radio Access (E-UTRA); Physical layer procedures (Release 13)", 3GPP Standard: 3GPPTS 36.213, 3rd Generation Partnership Project (3GPP), Mobile Competence Centre; 650, Route Des Lucioles; F-06921 Sophia-Antipolis Cedex; France, vol. RAN WGI, No. V13.2.0, Jun. 30, 2016 (Jun. 30, 2016), pp. 7-44, XP051123691 [retrieved on Jun. 30, 2016] chapter 5.1.1 Physical Uplink Shared Channel.
Catt: "UL power control with multiple timing advances in Rel-11", 3GPP Draft; RI-122035, 3rd Generation Partnership Project (3GPP), Mobile Competence Centre, 650, Route Des Lucioles; F-06921 Sophia-Antipolis Cedex; France, vol. RAN WGI, no. Prague, Czech Republic; May 21, 2012-May 25, 2012, May 12, 2012 (May 12, 2012), XP050600325, [retrieved on May 12, 2012] the whole document.
Extended European Search Report for European Application No. 16912558.0; dated Jul. 5, 2019; Date of Completion: Jun. 26, 2019; 11 Pages.
Samsung: "Study on specification impact for uplink due to TTI shortening", 3GPP Draft; RI-156822, 3rd Generation Partnership Project (3GPP), Mobile Competence Centre; 650, Route Des Lucioles; F-06921 Sophia-Antipolis Cedex; France, vol. RAN WGI, no. Anaheim, USA; Nov. 15, 2015-Nov. 22, 2015, Nov. 15, 2015 (Nov. 15, 2015), XP051003182, Retrieved from the Internet: URL:http://www.3gpp.org/ftp/Meetings_3GPP_SYNC/RAN1/Docs/ [retrieved on Nov. 15, 2015] the whole document.
English Translation of International Search Report for International Application No. PCT/CN2016/110192, dated Apr. 12, 2017, 5 pages.
3GPP TS 36.213 V11.8.0, Sep. 22, 2014 (Sep. 22, 2014), 5.Power control, 182 pages.

* cited by examiner

UPLINK POWER CONTROL METHOD, APPARATUS AND STORAGE MEDIUM

CROSS REFERENCE

The present application is based on International Application No. PCT/CN2016/110192, filed on Dec. 15, 2016, which is based upon and claims priority to Chinese Patent Application No. 201610670240.1, filed on Aug. 12, 2016, and the entire contents thereof are incorporated herein by reference.

TECHNICAL FIELD

The present disclosure relates to the field of communication, and in particular to an uplink power control method, an uplink power control apparatus, and a storage medium.

BACKGROUND

The rapid development of the mobile Internet and the Internet of Things has led to the explosive growth of data traffic and the proliferation of diversified and differentiated services. As a new generation of mobile communication technology, compared to 4G, 5G can support higher speed (Gbps), massive link (1 M/Km2), ultra-low latency (1 ms), higher reliability, and 100 times of energy efficiency improvement, etc., in order to support new changes in demand. Among them, ultra-low latency is a key indicator of 5G technology, which directly affects the development of time-limited services such as car networking, industrial automation, remote control, and smart grid. A series of current standards for 5G delay reduction are gradually being advanced.

Transmission Time Interval (TTI) reduction is an important research direction for the current delay reduction. It aims to reduce the TTI of the current 1 ms length to 0.5 ms or even the length of 1-2 OFDM symbols, which can reduce the scheduling time by times, and this, in turn, can reduce single transmission delay by times without changing the frame structure. 3GPP has also established a short TTI delay reduction technique.

In the existing LTE technology, power control for the uplink transmitter plays a very important role. On the one hand, it is necessary to provide sufficient transmission energy per bit to achieve QoS, and on the other hand, it should minimize interference in the system and maximize the battery life of the terminal. In the existing LTE power control mode, the uplink transmission power can be regarded as the sum of two main items, one of which is a static or semi-static parameter sent from the eNB to obtain a basic open-loop operating point, and the other of which is a dynamic offset for per subframe update. The dynamic offset part further includes a MCS-based part and a TPC command part. The TPC command has two working modes: an accumulated TPC command and an absolute TPC command. The accumulated TPC command is available for both of PUSCH and PUCCH, and the absolute TPC command is only available for PUSCH. In the accumulated TPC command, the transmission power formula includes a power accumulation amount, including the power accumulation amount of the current subframe being equal to the sum of the power accumulation amount of the previous subframe and the power offset amount of the current subframe.

There is currently no effective solution for the uplink power control of the short TTI.

SUMMARY

The present disclosure provides an uplink power control method, an uplink power control apparatus, and a storage medium, to at least solve the problem of uplink power control for a short TTI in the related art.

According to one aspect of the present disclosure, there is provided an uplink power control method, including: acquiring a power control parameter, when an uplink channel is transmitted with one of multiple TTI lengths, or an uplink channel is transmitted with one of multiple timings; and determining a transmission power of the uplink channel according to the power control parameter, wherein the uplink channel is a PUSCH or a PUCCH.

As an implementation, when the uplink channel is transmitted on a TTI with an index i using one of the multiple timings, k, the power accumulation amount is $f(i)=f(i-m)+\delta$, where $f(i-m)$ is a power accumulation amount on a TTI with an index $i-m$, $\delta$ is a power offset amount on the TTI with the index i, the power offset amount is notified in a TPC command corresponding to the TTI with the index i, and a TTI in which the TPC command is located is a TTI with an index $i-k$.

As an implementation, the TTI with the index $i-m$ is a TTI closest to the TTI with the index i among all TTIs satisfying any one of conditions that: no said uplink channel has been transmitted on the TTI with the index $i-m$; the uplink channel has been transmitted on the TTI with the index $i-m$, and the uplink channel has been transmitted with the timing k of the multiple timings.

As an implementation, the TTI with the index $i-m$ is a TTI closest to the TTI with the index i among all TTIs satisfying any one of conditions that: no said uplink channel has been transmitted on the TTI with the index $i-m$; the uplink channel has been transmitted on the TTI with the index $i-m$, and the TTI in which the TPC command corresponding to the TTI with the index $i-m$ is located is before the TTI with the index $i-k$.

As an implementation, each of the power control parameters is the same for all TTI lengths.

As an implementation, when the uplink channel is transmitted with one of multiple TTI lengths, the transmission power of the uplink channel is a function of the TTI length, or, the transmit power or the power control parameter of the uplink channel is determined based on the TTI length.

As an implementation, for PUSCH, the power control parameters include at least one of: a cell-specific power parameter of the PUSCH, Po_nominal; a UE-specific power parameter of the PUSCH, Po_UE; a path-loss compensation coefficient of the PUSCH, alpha; a MCS-based power control enable parameter; and an accumulated power control enable parameter.

As an implementation, for PUCCH, the power control parameter includes at least one of: a cell-specific power parameter of the PUCCH, Po_nominal; a UE-specific power parameter of the PUCCH, Po_UE; an adjustment amount corresponding to a cell-specific transport format, $\Delta_{F\_PUCCH}$ (F); and a related parameter for a transmission port.

As an implementation, the power control parameter includes a first power control parameter and a second power control parameter, wherein the first power control parameter is the same for all TTI lengths, and the second power control parameter is respectively configured according to the TTI length.

As an implementation, for PUSCH, the first power control parameter is at least one of: a cell-specific power parameter of the PUSCH, Po_nominal; a UE-specific power parameter of the PUSCH, Po_UE; a MCS-based power control enable parameter; and an accumulated power control enable parameter; and the second power control parameter is a path-loss compensation coefficient of the PUSCH, alpha.

As an implementation, for PUCCH, the first power control parameter is at least one of: a cell-specific power parameter of the PUCCH, Po_nominal; a UE-specific power parameter of the PUCCH, Po_UE; and a related parameter for a transmission port, and the second power control parameter is an adjustment amount corresponding to a cell-specific transport format, $\Delta_{F\_PUCCH}(F)$.

As an implementation, the second power control parameter is separately configured according to a TTI length, including one of that: the second power control parameter is separately configured for each TTI length; and the second power control parameter is configured separately for a TTI length of 1 ms and a TTI length of less than 1 ms.

As an implementation, when the uplink channel is transmitted on a TTI with the index i with one of multiple TTI lengths, the power accumulation amount is $f(i)=f(i-1)+\delta$ where $f(i-1)$ is a power accumulation amount on a TTI with an index i−1, $\delta$ is a power offset amount on the TTI with the index i, and the power offset amount is notified in a TPC command corresponding to the TTI with the index i, a TTI in which the TPC command is located is a TTI with an index of i−k, where the TTI with the index i−1 has the same TTI length as the TTI with the index i.

As an implementation, when the uplink channel is transmitted on a TTI with the index i with one of multiple TTI lengths, the power accumulation amount is $f(i)=f(i-1)+\delta$ where $f(i-1)$ is a power accumulation amount on a TTI with an index i−1, $\delta$ is a power offset amount on the TTI with the index i, and the power offset amount is notified in a TPC command corresponding to the TTI with the index i, a TTI in which the TPC command is located is a TTI with an index of i−k, where the TTI with the index i−1 and the TTI length of the TTI with the index i belong to the same set.

As an implementation, when the uplink channel is transmitted on the current TTI with one of multiple TTI lengths, the power accumulation amount is $f=f'+\delta$, where $f'$ is a power accumulation amount corresponding to the uplink channel with a TTI length L which was transmitted at the most recent time before the current TTI, $\delta$ is a power offset amount on the current TTI, where the power offset amount is notified in a TPC command corresponding to the current TTI.

As an implementation, when the uplink channel is transmitted on the current TTI with one of multiple TTI lengths, the power accumulation amount is $f=f'+\delta$, where $\delta$ is a power offset amount on the current TTI, and the power offset amount is notified in a TPC command corresponding to the current TTI; $f'$ is a power accumulation amount corresponding to the uplink channel with a TTI length L0 that was transmitted at the most recent time before the current TTI; or is a TTI with a length L0 which has a corresponding TPC command and is closest to the current TTI before the current TTI, where L0 and L belong to the same set.

As an implementation, when the uplink channel is transmitted on the current TTI with one of multiple TTI lengths, the power accumulation amount is $f=f'+\delta$, where $f'$ is a power accumulation amount on a designated TTI, and a TTI length corresponding to the designated TTI is one of the multiple TTI lengths, $\delta$ is a power offset amount on the current TTI, and the power offset amount is notified in a TPC command corresponding to the current TTI.

As an implementation, the designated TTI is one of the designated TTI is the TTI closest to the current TTI; the designated TTI is one of multiple TTIs that are closest to the current TTI; the designated TTI is the TTI that transmitted the uplink channel at the most recent time; the designated TTI is one of multiple TTIs that transmitted the uplink channel at the most recent time; the designated TTI is the TTI closest to the current TTI before the current TTI, which has the corresponding TPC command; the designated TTI is one of multiple TTIs closest to the current TTI before the current TTI, which have corresponding TPC commands; the designated TTI is the TTI closest to the fifth TTI before the fifth TTI; the designated TTI is one of multiple TTIs that are closest to the fifth TTI; the designated TTI is the TTI closest to the fifth TTI before the fifth TTI, which has the corresponding TPC command; the designated TTI is one of multiple TTIs closest to the fifth TTI before the fifth TTI, which have corresponding TPC commands; and the fifth TTI overlaps with the current TTI in time, and the TTI length of the fifth TTI is greater than the TTI length of the current TTI.

As an implementation, the designated TTI is before the current TTI.

As an implementation, the fifth TTI is one subframe.

As an implementation, the TPC command corresponding to the designated TTI is before the TPC command corresponding to the current TTI.

As an implementation, the TTI in which the TPC command corresponding to the current TTI is located does not transmit an uplink channel before the current TTI; or from the TTI in which the TPC command corresponding to a TTI before the current TTI is located to the current TTI, an uplink channel has been transmitted at the UE side, and the TTI in which the TPC command corresponding to the TTI that has transmitted the uplink channel is before the TTI in which the TPC command corresponding to the current TTI is located; or all TTIs from the TTI in which the TPC command corresponding to the current TTI is located to a TTI before the current TTI has no corresponding TPC command.

As an implementation, the designated TTI is one of the TTIs closest to the current TTI or one of the multiple TTIs closest to the current TTI that satisfy one of conditions that: the uplink channel has been transmitted on the designated TTI at the UE side; and there is a corresponding TPC command on the designated TTI at the UE side.

As an implementation, the designated TTI is the previous TTI of the second TTI, and the second TTI is, among all TTIs, the TTI or one of multiple TTIs closest to the TTI in which the TPC command corresponding to the current TTI is located, which satisfies any one of conditions that: the uplink channel has been transmitted on the second TTI, and the TTI in which the TPC command corresponding to the second TTI is located is within or after the TTI in which the TPC command corresponding to the current TTI is located; and there is a corresponding TPC command on the second TTI at the UE side, and the TTI in which the TPC command is located is within or after the TTI in which the TPC command corresponding to the current TTI is located.

As an implementation, the designated TTI is one of the TTIs closest to the current TTI or one of the multiple TTIs closest to the current TTI that satisfy one of conditions that: the uplink channel has been transmitted on the designated TTI at the UE side, and the TTI in which the TPC command corresponding to the uplink channel is located is before the TTI in which the TPC command corresponding to the current TTI is located; and, there is a TPC command corresponding to the designated TTI at the UE side, and the TPC command is before the TTI in which the TPC command corresponding to the current TTI is located.

As an implementation, the multiple TTIs have the same cut-off time.

As an implementation, the transmission times of the multiple TTIs overlap with one another.

As an implementation, the multiple TTIs are N TTIs, where N is an integer greater than 1, and the designated TTI is one of the designated TTI is a TTI of the multiple TTIs which has a preset length; in the time corresponding to the first TTI, when one said uplink channel has been transmitted, and the length of the TTI that transmits the uplink channel is L1, the designated TTI is a TTI having a length of L1 among the N TTIs; in the time corresponding to the first TTI, when one said uplink channel has been transmitted, and the length of the TTI that transmits the uplink channel is L1, the designated TTI is a TTI having a length of L3 among the N TTIs, where L1 and L3 belong to the same set; in the time corresponding to the first TTI, when a number N1 of the uplink channels have been transmitted, the designated TTI is a TTI having a length of L2 among the N TTIs, where L2 is one of the TTI lengths of the number N1 of the uplink channels; in the time corresponding to the first TTI, when a number N1 of the uplink channels have been transmitted, the designated TTI is a TTI having a length of L4 among the N TTIs, where L4 and at least one of the TTI lengths of the number N1 of the uplink channels belong to the same set; in the time corresponding to the first TTI, when a TTI having a length of L6 has a corresponding TPC command, the designated TTI is a TTI having a TTI length of L7 among the N TTIs, where L6 and L7 belong to the same set; and in the time corresponding to the first TTI, when N2 TTIs have corresponding TPC commands, the designated TTI is a TTI having a TTI length of L8 among the N TTIs, where L8 and at least one of the TTI lengths of the N2 TTI belong to the same set; and wherein the first TTI is the TTI with the longest TTI length among the N TTIs.

As an implementation, in the time corresponding to the first TTI, when a number N1 of the uplink channels have been transmitted, the designated TTI is a TTI having a length of L2 among the N TTIs, where L2 is one of the TTI lengths of the number N1 of the uplink channels, including a condition satisfying one of when the TTI length of the current TTI is L2, the TTI length of the designated TTI is L2; and in the number N1 of the uplink channels, when TTIs with the TTI length L2 have transmitted the largest number of the uplink channels, the TTI length of the designated TTI is L2.

As an implementation, in the time corresponding to the first TTI, when a number N1 of the uplink channels have been transmitted, the designated TTI is a TTI having a length of L4 among the N TTIs, where L4 and at least one of the TTI lengths of number N1 of the uplink channels belong to the same set, including one of when the TTI length of the current TTI is L5, then L4 and L5 belong to the same set; and in the first TTI, in the number N1 of the uplink channels, when TTI lengths belonging to the same set of TTI lengths have transmitted the largest number of the uplink channels, L4 belongs to the set.

As an implementation, the condition for the designated TTI being a TTI having a preset length among the multiple TTIs is that, no said uplink channel is transmitted within a time corresponding to the first TTI.

As an implementation, the TTI having the preset length is a TTI having the same length as the current TTI.

As an implementation, the preset length and the TTI length of the current TTI belong to the same set.

As an implementation, for one TTI, when no PUSCH is transmitted on the TTI or there is no corresponding TPC command, the power offset amount δ=0.

As an implementation, when only the DMRS corresponding to the uplink channel is transmitted on the fourth TTI, and the data corresponding to the uplink channel is transmitted on a TTI other than the fourth TTI, at least one of the following establishes: the power accumulation amount on the TTI in which the data is located is equal to the power accumulation amount on the fourth TTI, or has a power offset from the power accumulation amount on the fourth TTI; the power accumulation amount on the TTI in which the data is located is equal to the power accumulation amount corresponding to the DMRS, or has a power offset from the power accumulation amount corresponding to the DMRS; and the transmission power of the data is equal to the transmission power of the DMRS, or has a power offset from the transmission power of the DMRS.

As an implementation, when the UE receives at least two uplink grants, and DMRSs of the PUSCHs scheduled by the at least two uplink grants are in the same symbol, then, the UE expects that the power offset amounts indicated in the received at least two uplink grants are equal to each other.

As an implementation, when only the data corresponding to the uplink channel is transmitted on the sixth TTI, and the DMRS corresponding to the uplink channel is transmitted on the TTI other than the sixth TTI, at least one of the following establishes: the power accumulation amount on the TTI in which the DMRS is located is equal to the power accumulation amount on the sixth TTI, or has a power offset from the power accumulation amount on the sixth TTI; the power accumulation amount corresponding to the DMRS is equal to the power accumulation amount on the sixth TTI or has a power offset from the power accumulation amount on the sixth TTI; and the transmission power of the DMRS is equal to the transmission power of the data or has a power offset from the transmission power of the data.

As an implementation, when the UE receives at least two uplink grants, and DMRSs of the PUSCHs scheduled by the at least two uplink grants are in the same symbol, then, the UE expects that, the power offset amount indicated in the uplink grant other than the first uplink grant of the received at least two uplink grants is equal to 0; wherein data corresponding to the first uplink grant of the at least two uplink grants is transmitted earliest.

As an implementation, when the UE receives the uplink grant, and the uplink grant indicates that the UE sends the PUSCH on at least two TTIs, at least one of the following establishes: the power accumulation amount on the at least two TTIs is equal to the power accumulation amount of the first one of the at least two TTIs; the transmission power on the at least two TTIs is equal to the transmission power of the first one of the at least two TTIs; the power accumulation amounts on the at least two TTIs are equal to each other; and the transmission powers on the at least two TTIs are equal to each other.

As an implementation, the power offset is preset or notified by the eNB.

As an implementation, when the uplink channel is transmitted with one of multiple TTI lengths, the method further includes: determining a transmission power of the SRS or the reporting method of the PHR.

As an implementation, determining the transmission power of the SRS includes: determining the transmission power of the SRS according to a power control parameter and a power accumulation amount of a PUSCH on a designated TTI, wherein the length of the designated TTI is one of the multiple TTI lengths.

As an implementation, the length of the designated TTI is determined by a time domain and/or a frequency domain location of the SRS.

As an implementation, the designated TTI is one of the TTI in which the SRSs are located or the TTI in which the SRS is located.

As an implementation, when there are N TTIs in which the SRSs are located, the designated TTI is one of that: in the time corresponding to the third TTI, when a PUSCH has been transmitted, and the length of the TTI for transmitting the PUSCH is L1, the designated TTI is a TTI with a TTI length of L1 among the N TTIs; in the time corresponding to the third TTI, when a PUSCH has been transmitted, and the length of the TTI for transmitting the PUSCH is L1, the designated TTI is a TTI among the N TTIs of which the TTI length and L1 belong to the same set; in the time corresponding to the third TTI, when a PUSCH has been transmitted, the designated TTI is a TTI in which the TTI length is L2 among the N TTIs, where L2 is one of the TTI lengths of the N1 PUSCHs; when the TTI length of the most recently transmitted PUSCH before the SRS is L3, the designated TTI is a TTI among the N TTIs of which the TTI length and L3 belong to the same set; where the third TTI is the TTI with the longest TTI length among the N TTIs.

As an implementation, in case where the PUSCH is transmitted with one of multiple TTI lengths, when the PHR is triggered, the reporting manner of the PHR includes one of reporting the PHR on the first PUSCH that is transmitted after the PHR is triggered, where the TTI length corresponding to the PUSCH is one of the multiple TTI lengths; reporting the PHR on the first PUSCH that is transmitted with the preset TTI length after the PHR is triggered, where the preset TTI length is one of the multiple TTI lengths; and reporting the PHR on the first PUSCH transmitted with each TTI length after the PHR is triggered.

As an implementation, the set is preset or notified by the eNB.

As an implementation, the set is a subset of the set of the multiple TTI lengths.

As an implementation, the set is one of:
{2 symbols};
{3 symbols};
{4 symbols};
{7 symbols};
{14 symbols};
{2 symbols, 3 symbols};
{3 symbols, 4 symbols};
{2 symbols, 3 symbols, 7 symbols};
{3 symbols, 4 symbols, 7 symbols}; and
{2 symbols, 3 symbols, 4 symbols, 7 symbols}.

50. The method according to claim 49, wherein the PUSCH satisfies at least one of the PUSCH transmits a new packet; and the PUSCH can accommodate a PHR and a subhead corresponding to the PHR.

As an implementation, the PHR is transmitted on the designated PUSCH after the PHR is triggered.

As an implementation, when there are at least two PUSCH to be transmitted in one subframe, the designated PUSCH is one of the PUSCH of the longest length among the at least two PUSCHs; the PUSCH of the shortest length among the at least two PUSCHs; the PUSCH on the primary carrier; and the PUSCH with the smallest carrier index of the corresponding secondary carrier or the PUSCH with the largest carrier index of the corresponding secondary carrier.

As an implementation, the PHR is obtained according to at least one of: on the designated carrier, when PUSCHs are transmitted within a designated time period, the PHR is obtained according to one of the PUSCHs; otherwise, the PHR is obtained according to the case where no PUSCH has been transmitted; on the designated carrier, when PUCCHs are transmitted within a designated time period, the PHR is obtained according to one of the PUCCHs; otherwise, the PHR is obtained according to the case where no PUCCH has been transmitted; on the designated carrier, when no PUSCH has been transmitted, or a PUSCH has been transmitted, but the TTI length of the PUSCH is shorter than the TTI length of the designated PUSCH, the PHR is obtained according to the case where no PUSCH has been transmitted; on the designated carrier, when no PUCCH has been transmitted, or a PUCCH has been transmitted, but the TTI length of the PUCCH is shorter than the TTI length of the designated PUSCH, the PHR is obtained according to the case where no PUCCH has been transmitted; a start position of the designated time period is equal to or later than the start of the start symbol of the designated PUSCH, and the cutoff position is equal to or earlier than the end of the end symbol of the designated PUSCH; the TTI length corresponding to the PUSCH or the PUCCH is different from the TTI length corresponding to the designated PUSCH; and the designated carrier is a carrier other than the carrier where the designated PUSCH is located.

As an implementation, one PUSCH of the PUSCHs includes: the first PUSCH of the PUSCHs; and the last PUSCH of the PUSCHs.

As an implementation, one PUCCH of the PUSCHs includes: the first PUCCH of the PUCCHs; and the last PUCCH of the PUCCHs.

As an implementation, the designated time period includes: a start position of the designated time period being a start of a start symbol of the designated PUSCH, and a cutoff position being one of the first k symbols within the transmission time corresponding to the designated PUSCH; a first TTI within a transmission time corresponding to the designated PUSCH, where the TTI is a TTI corresponding to the designated carrier; where k is a positive integer.

According to another aspect of the present disclosure, there is provided an uplink power control method, including: sending, by a base station side, a power control parameter to a UE side, when an uplink channel is transmitted with one of multiple TTI lengths, or an uplink channel is transmitted with one of multiple timings; wherein the power control parameter is used for determining a transmission power of the uplink channel, and the uplink channel is a PUSCH or a PUCCH.

As an implementation, each of the power control parameters is the same for all TTI lengths.

As an implementation, before sending, by a base station side, a power control parameter to a user equipment UE, the method further comprises: configuring, by the base station side, the power control parameter.

As an implementation, for a PUSCH, the power control parameter comprises at least one of a cell-specific power parameter of the PUSCH, Po_nominal; a UE-specific power parameter of the PUSCH, Po_UE; a path-loss compensation coefficient of the PUSCH, alpha; a MCS-based power control enable parameter; and an accumulated power control enable parameter.

As an implementation, for a PUCCH, the power control parameter comprises at least one of a cell-specific power parameter of the PUCCH, Po_nominal; a UE-specific power parameter of the PUCCH, Po_UE; an adjustment amount corresponding to a cell-specific transport format; and a related parameter for a transmission port.

As an implementation, the power control parameter comprises a first power control parameter and a second power control parameter, wherein the first power control parameter is the same for all TTI lengths, and the second power control parameter is respectively configured according to the TTI length.

As an implementation, for PUSCH, the first power control parameter is at least one of: a cell-specific power parameter of the PUSCH, Po_nominal; a UE-specific power parameter of the PUSCH, Po_UE; a MCS-based power control enable parameter; and an accumulated power control enable parameter; and the second power control parameter is a path-loss compensation coefficient of the PUSCH, alpha.

As an implementation, for PUCCH, the first power control parameter is at least one of: a cell-specific power parameter of the PUCCH, Po_nominal; a UE-specific power parameter of the PUCCH, Po_UE; and a related parameter for a transmission port, and the second power control parameter is an adjustment amount corresponding to a cell-specific transport format.

As an implementation, the second power control parameter is separately configured according to a TTI length, comprising one of that: the second power control parameter is separately configured for each TTI length; and the second power control parameter is configured separately for a TTI length of 1 ms and a TTI length of less than 1 ms.

As an implementation, in case where the PUSCH is transmitted with one of multiple TTI lengths, when the PHR is triggered, the method further comprises: receiving, by the base station side, the PHR on the PUSCH.

As an implementation, receiving, by the base station side, the PHR on the PUSCH comprises one of: receiving the PHR on the first PUSCH that is transmitted after the PHR is triggered, where the TTI length corresponding to the PUSCH is one of the multiple TTI lengths; receiving the PHR on the first PUSCH that is transmitted with the preset TTI length after the PHR is triggered, where the preset TTI length is one of the multiple TTI lengths; and receiving the PHR on the first PUSCH transmitted with each TTI length after the PHR is triggered.

According to another aspect of the present disclosure, there is provided an uplink power control apparatus, including: an acquiring module configured to, when an uplink channel is transmitted with one of multiple TTI lengths, or an uplink channel is transmitted with one of multiple timings, acquire a power control parameter; and a determining module configured to determine a transmission power of the uplink channel according to the power control parameter, wherein the uplink channel is a PUSCH or a PUCCH. As an implementation, when the uplink channel is transmitted on a TTI with an index i using one of the multiple timings, k, the power accumulation amount is $f(i)=f(i-m)+\delta$, where $f(i-m)$ is a power accumulation amount on a TTI with an index i–m, $\delta$ is a power offset amount on the TTI with the index i, the power offset amount is notified in a TPC command corresponding to the TTI with the index i, and a TTI in which the TPC command is located is a TTI with an index i–k.

As an implementation, the TTI with the index i–m is a TTI closest to the TTI with the index i among all TTIs satisfying any one of conditions that: no said uplink channel has been transmitted on the TTI with the index i–m; the uplink channel has been transmitted on the TTI with the index i–m, and the uplink channel has been transmitted with the timing k of the multiple timings.

As an implementation, the TTI with the index i–m is a TTI closest to the TTI with the index i among all TTIs satisfying any one of conditions that: no said uplink channel has been transmitted on the TTI with the index i–m; the uplink channel has been transmitted on the TTI with the index i–m, and the TTI in which the TPC command corresponding to the TTI with the index i–m is located is before the TTI with the index i–k.

As an implementation, each of the power control parameters is the same for all TTI lengths.

As an implementation, for PUSCH, the power control parameters comprise at least one of a cell-specific power parameter of the PUSCH, Po_nominal; a UE-specific power parameter of the PUSCH, Po_UE; a path-loss compensation coefficient of the PUSCH, alpha; a MCS-based power control enable parameter; and an accumulated power control enable parameter.

As an implementation, for a PUCCH, the power control parameter comprises at least one of a cell-specific power parameter of the PUCCH, Po_nominal; a UE-specific power parameter of the PUCCH, Po_UE; an adjustment amount corresponding to a cell-specific transport format, $\Delta_{F\_PUCCH}(F)$; and a related parameter for a transmission port.

As an implementation, when an uplink channel is transmitted with one of multiple TTI lengths, the transmission power of the uplink channel is a function of a TTI length.

As an implementation, the power control parameter comprises a first power control parameter and a second power control parameter, wherein the first power control parameter is the same for all TTI lengths, and the second power control parameter is respectively configured according to the TTI length.

As an implementation, for PUSCH, the first power control parameter is at least one of a cell-specific power parameter of the PUSCH, Po_nominal; a UE-specific power parameter of the PUSCH, Po_UE; a MCS-based power control enable parameter; and an accumulated power control enable parameter; and the second power control parameter is a path-loss compensation coefficient of the PUSCH, alpha.

As an implementation, for PUCCH, the first power control parameter is at least one of a cell-specific power parameter of the PUCCH, Po_nominal; a UE-specific power parameter of the PUCCH, Po_UE; and a related parameter for a transmission port, and the second power control parameter is an adjustment amount corresponding to a cell-specific transport format, $\Delta_{F\_PUCCH}(F)$.

As an implementation, the second power control parameter is separately configured according to a TTI length, comprising one of that: the second power control parameter is separately configured for each TTI length; and the second power control parameter is configured separately for a TTI length of 1 ms and a TTI length of less than 1 ms.

As an implementation, when the uplink channel is transmitted with one of multiple TTI lengths, the determining module is further configured to determine a transmission power of the SRS or the reporting method of the PHR.

As an implementation, the determining module comprises: a first determining unit configured to determine the transmission power of the SRS according to a power control parameter and a power accumulation amount of a PUSCH on a designated TTI, wherein the length of the designated TTI is one of the multiple TTI lengths.

As an implementation, the length of the designated TTI is determined by a time domain and/or a frequency domain location of the SRS.

As an implementation, the designated TTI is a TTI in which the SRS is located or one of TTIs in which the SRSs are located.

As an implementation, when there are N TTIs in which the SRSs are located, the designated TTI is one of that:

when a PUSCH has been transmitted, and the length of the TTI for transmitting the PUSCH is L1, the designated TTI is a TTI with a TTI length of L1 among the N TTIs; in the time corresponding to the third TTI, when a PUSCH has been transmitted, the designated TTI is a TTI in which the TTI length is L2 among the N TTIs, where L2 is one of the TTI lengths of the N1 PUSCHs; where the third TTI is the TTI with the longest TTI length among the N TTIs;

when the PUSCH is transmitted with one of multiple TTI lengths, the uplink power control apparatus comprises: a reporting module configured to, after the PHR is triggered, report the PHR to the base station side on the PUSCH.

As an implementation, the reporting manner of the PHR comprises one of: reporting the PHR on the first PUSCH that is transmitted after the PHR is triggered, where the TTI length corresponding to the PUSCH is one of the multiple TTI lengths; reporting the PHR on the first PUSCH that is transmitted with the preset TTI length after the PHR is triggered, where the preset TTI length is one of the multiple TTI lengths; and reporting the PHR on the first PUSCH transmitted with each TTI length after the PHR is triggered.

An embodiment of the present disclosure also provides a storage medium configured to store program codes for performing the aforementioned method.

In the above embodiment of the present disclosure, when an uplink channel is transmitted with one of multiple TTI lengths, or an uplink channel is transmitted with one of multiple timings, a transmission power of the uplink channel is determined according to the power control parameter. Thereby it can solve the problem of uplink power control for a short TTI in the related art.

BRIEF DESCRIPTION OF THE DRAWINGS

The drawings described herein are intended to provide a further understanding of the present disclosure, and are intended to constitute a part of the present application. The illustrative embodiments of the present disclosure and their description serve to explain the present disclosure, and do not constitute an improper limiting of the present disclosure. In the drawing.

DETAILED DESCRIPTION

The present disclosure will be described in detail below with reference to the accompanying drawings in conjunction with the embodiments. It should be noted that the embodiments in the present application and the features in the embodiments may be combined with each other without conflict.

It is to be understood that the terms "first", "second", and the like in the specification and claims as well as the above accompanying drawings of the present disclosure are used to distinguish similar objects, and are not necessarily used to describe a particular order or sequence.

Figure 1:
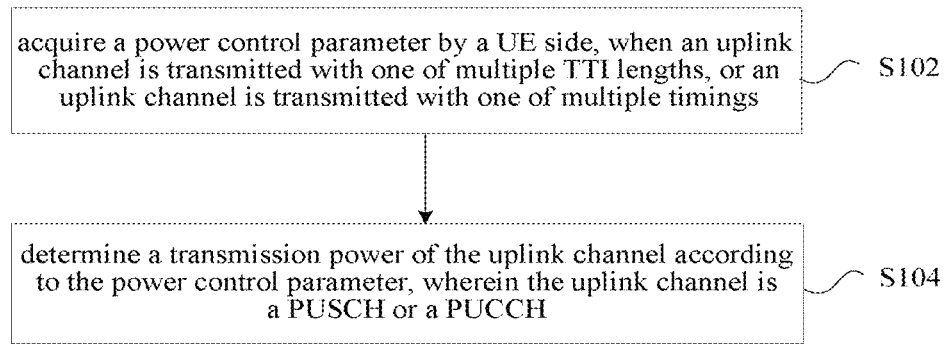
FIG. 1 is a flowchart of an uplink power control method according to an embodiment of the present disclosure.

In this embodiment, an uplink power control method is provided. FIG. 1 is a flowchart of uplink power control according to an embodiment of the present disclosure. As shown in FIG. 1, the process includes the following steps.

In Step S102, when an uplink channel is transmitted with one of multiple TTI lengths, or an uplink channel is transmitted with one of multiple timings, a power control parameter is acquired.

In Step S104, a transmission power of the uplink channel is determined according to the power control parameter, wherein the uplink channel is a PUSCH or a PUCCH.

In the embodiment of the present disclosure, the problem of uplink power control of multiple lengths of TTI in the related art can be solved through the above steps.

First Embodiment

This embodiment provides a method for transmitting information.

For the existing LTE system, if the timing between the uplink grant and the PUSCH is modified, the calculation formula of the PUSCH transmission power should be modified accordingly That is, the definition of the closed loop power control part should be modified accordingly. The formula for PUSCH transmission power in the existing LTE is:

$$P_{PUSCH,c}(i) = \min\begin{cases} P_{CMAX,c}(i), \\ 10\log_{10}(M_{PUSCH,c}(i)) + \\ P_{O\_PUSCH,c}(j) + \alpha_c(j) \cdot PL_c + \Delta_{TF,c}(i) + f_c(i) \end{cases}$$

Wherein, $P_{O\_PUSCH}(j)$ includes $P_{O\_NOMINAL\_PUSCH}(j)$ and $P_{O\_UE\_PUSCH}(j)$, $P_{O\_NOMINAL\_PUSCH}(j)$ is a cell-specific power parameter of the PUSCH, $P_{O\_UE\_PUSCH}(j)$ is a UE-specific power parameter of the PUSCH, and $\alpha_c(j)$ is a path-loss compensation coefficient of the PUSCH.

For the accumulated TPC command, the power accumulation amount on a subframe i is $f_c(i)=f_c(i-1)+\delta_{PUSCH,c}(i-K_{PUSCH})$, where $\delta_{PUSCH,c}(i-K_{PUSCH})$ is a power offset amount. If there is a TPC command on the subframe $i-K_{PUSCH}$, then the power offset amount corresponding to the TPC command is $\delta_{PUSCH,c}(i-K_{PUSCH})$. If the subframe i is not an uplink subframe, or the subframe i does not have a corresponding TPC command, then $\delta_{PUSCH,c}(i-K_{PUSCH})$. For FDD, $K_{PUSCH}=4$. If the timing between the uplink grant and the PUSCH is modified to the scheduling grant on an uplink grant scheduling subframe n+k on a subframe #n, where k<4, such as k=2, then, $K_{PUSCH}=k$ in this case.

For an absolute TPC commands, $f_c(i)=\delta_{PUSCH,c}(i-K_{PUSCH})$, if the timing is modified, then $K_{PUSCH}=k$.

Figure 2:
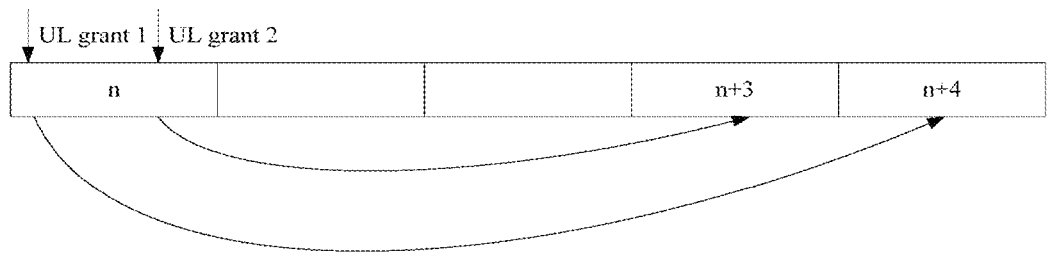
FIG. 2 is a schematic diagram of uplink grant timing according to an embodiment of the present disclosure.

In the LTE system, if the existing timing and the modified timing are switched, as shown in FIG. 2, the uplink grant 1 adopts the existing timing, and the uplink grant 2 adopts the modified timing.

For the accumulated TPC command, according to the related art, here is $f_c(n+4)=f_c(n+3)+\delta_{PUSCH,c}(n+4-K_{PUSCH})$ where $f_c(n+3)$ is obtained according to the TPC command of the subframe n, and $f_c(n+4)$ is obtained according to $f_c(n+3)$ and the TPC command of the subframe n. This is not reasonable since the TPC commands for PUSCH of the subframes n+3 and n+4 are all made from the subframe n.

Figure 3:
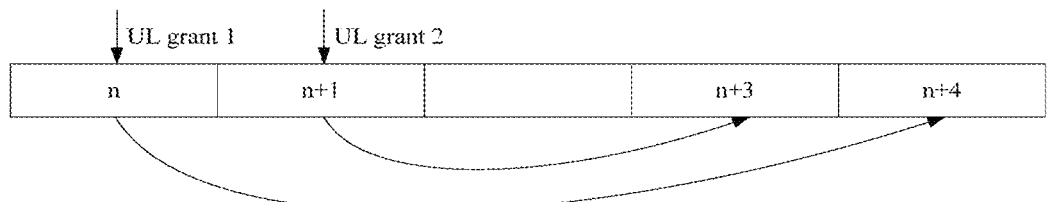
FIG. 3 is a schematic diagram of uplink grant timing according to an embodiment of the present disclosure.

For another example, as shown in FIG. 3, the uplink grant 1 uses the existing timing, and the uplink grant 2 uses the modified timing.

As shown in FIG. 3, for a subframe n+4, if according to the existing protocol, $f_c(n+4)=f_c(n+3)+\delta_{PUSCH,c}(n+4-K_{PUSCH})$, the TPC command corresponding to the subframe (n+3) is actually transmitted from the subframe (n+1), after the subframe n, it is not reasonable to use the power of the subframe (n+3) to adjust the power of the subframe (n+4).

In order to solve the above problem, a method is given below.

For the accumulated TPC command, when calculating the power adjustment amount $f_c(i)$ at a certain timing, the power adjustment is not performed using a TPC command at other timing. A detailed description is given below.

When the uplink channel is transmitted on a current TTI using one of multiple timings, k, the power accumulation amount is $f(i)=f(i-m)+\delta$, where $f(i-m)$ is the power accumulation amount on the TTI indexed i−m, and $\delta$ is the power offset amount on the current TTI. The power offset amount is notified in the TPC command corresponding to the current TTI, and the TTI in which the TPC command is located is a TTI with an index of ik. Here, using the timing k means that the TPC command is received on the subframe #n, and the PUSCH corresponding to the TPC command is transmitted on the subframe #(n+k).

The current TTI is a TTI with an index i; the TTI with an index i−m is the TTI closest to the TTI with the index i, when any of the following conditions is satisfied.

Condition 1: the PUSCH is not transmitted on the TTI with the index i−m.

Condition 2: The PUSCH is transmitted on the TTI with the index i−m, and the uplink channel is transmitted using the timing k of the multiple timings.

Here, the TTI index may be a non-negative integer. For example, it is assumed that the index of the first TTI after reset is 0, and the index sequentially increases in chronological order.

For example, assuming that the transmission power on the subframe #8 is to be calculated, the closest subframe from the subframe #8 that satisfies the condition 1 is the subframe #7, and the closest subframe from the subframe #8 that satisfies the condition 2 is the subframe #6. Of the subframe #7 and the subframe #6, the subframe #6 is closer to the subframe #8, then the power accumulation amount on the subframe #8 is the sum of the power accumulation amount on the subframe #6 and the power offset amount on the subframe #8.

As shown in FIG. 3, to calculate the power accumulation amount on the subframe #(n+4), the timing corresponding to the subframe #(n+3) is different from the timing corresponding to the subframe #(n+4), and thus the condition 2 is not satisfied. The subframe #(n+2) satisfies the above condition 1. Therefore, the power accumulation amount on the subframe #(n+4) should be equal to the sum of the power accumulation amount on the subframe #(n+2) and the power offset amount on the subframe (n+4).

This method can also be used for power control of PUCCH.

Second Embodiment

This embodiment also provides a method for solving the problem in the first embodiment. In the method of the embodiment, in the accumulated TPC command, the two timings can be accumulated with each other, but the problem described in the first embodiment needs to be avoided.

In this method, the power adjustment amount $f_c(i)$ on the subframe i is the sum of the power adjustment amounts $f_c(i-m)$ on the subframe i−m and $\delta_{PUSCH,c}(i-K_{PUSCH})$ that is $f_c(i)=f_c(i-m)+\delta_{PUSCH,c}(i-K_{PUSCH})$. The subframe i−m is the subframe closest to the subframe i before the subframe i that satisfies the following conditions that: no PUSCH is transmitted or the PUSCH is transmitted but its corresponding TPC command is before the subframe i.

Alternatively, the subframe i−m is the closest subframe to the subframe i before the subframe i that satisfies the following condition that: there is no corresponding TPC command or the corresponding TPC command is before the subframe i.

The UE can obtain the subframes i−m, $f_c(i-m)$ and $f_c(i)$ as follows with one of the following methods.

Method One

It is assumed that m is a positive integer with an initial value of 1.

If there is no corresponding TPC command on the subframe i−m, and the TPC command is usually transmitted in DCI format 0/4 or 3/3a, then $f_c(i)=f_c(i-m)+\delta_{PUSCH,c}(i-K_{PUSCH})$ and the process ends.

If there is a corresponding TPC command on $f_c(i-m)$ and the subframe in which the TPC command is located is before the subframe $i-K_{PUSCH}$, then $f_c(i)=f_c(i-m)+\delta_{PUSCH,c}(i-K_{PUSCH})$ and the process ends.

Otherwise m=m+1, and the above process is repeated until f(i) is obtained.

Method Two

It is assumed that the timing on the subframe i is k, that is, the subframe n transmits the uplink grant, and the subframe n+k transmits the PUSCH for the uplink grant scheduling.

It is assumed that m is a positive integer with an initial value of 1.

If there is no corresponding TPC command on the subframe i−1, then $f_c(i)=f_c(i-m)+\delta_{PUSCH,c}(i-K_{PUSCH})$, and the process ends.

If there is a TPC command on the subframe i−1, and its timing is greater than k−m, then $f_c(i)=f_c(i-1)+\delta_{PUSCH,c}(i-K_{PUSCH})$, and the process ends.

Otherwise, m=m+1, the above process is repeated until $f_c(i)$ is obtained.

This method can also be used for power control of PUCCH.

Third Embodiment

This embodiment provides a method for configuring a parameter of power control.

In this embodiment, the UE supports at least two lengths of TTI, and the length of the TTI may be 1 ms TTI in the existing LTE system, or the TTI includes 2 symbols or 4 symbols or 7 symbols, and the 2 symbols or 4 symbols or 7 symbols may be physically continuous or discontinuous. For example, when the TTI length is 2, the DMRS is transmitted on the first symbol on one subframe, and the uplink data is transmitted on the third symbol of the subframe. The method provided in this embodiment can be used for PUSCH, and can also be used with PUCCH.

For the power calculation formula of the PUSCH, the eNB configures the same parameter for the UE for different TTI lengths. For example, the existing calculation formula for PUSCH is:

$$P_{PUSCH,c}(i) = \min\begin{cases} P_{CMAX,c}(i), \\ 10\log_{10}(M_{PUSCH,c}(i)) + \\ P_{O\_PUSCH,c}(j) + \alpha_c(j) \cdot PL_c + \Delta_{TF,c}(i) + f_c(i) \end{cases}$$

Where, $P_{O\_PUSCH}(j)$ including $P_{O\_NOMINAL\_PUSCH}(j)$ and $P_{O\_UE\_PUSCH}(j)$, $P_{O\_NOMINAL\_PUSCH}(j)$ is a cell-specific power parameter of the PUSCH, $P_{O\_UE\_PUSCH}(j)$ is a UE-specific power parameter of the PUSCH, and $\alpha_c(j)$ is a path-loss compensation coefficient of the PUSCH. There are also two parameters, that is, a MCS-based power control enable parameter, for enabling $\Delta_{TF,c}(i)$ therein, as well as an accumulated power control enable parameter, for enabling an accumulated TPC command mode.

In this embodiment, all parameters are the same for different TTI lengths, for example, $P_{O\_PUSCH}(j)$ corresponding to all TTIs is equal to 10 dB.

For the power calculation formula of PUCCH, $$P_{PUSCH}(i) = \min\begin{cases} P_{CMAX,c}(i), \\ P_{O\_PUSCH} + PL_c + h(n_{CQI}, n_{HARQ}, n_{SR}) + \\ \Delta_{F\_PUSCH}(F) + \Delta_{TxD}(F') + g(i) \end{cases}$$

Where, $P_{0\_PUCCH}$ is composed of two parts, $P_{O\_NOMINAL\_PUCCH}$ and $P_{O\_UE\_PUCCH}$. $P_{O\_NOMINAL\_PUCCH}$ is a cell-specific power parameter of the PUCCH, $P_{O\_UE\_PUCCH}$ is a UE-specific power parameter of the PUCCH, $\Delta_{F\_PUCCH}(F)$ is an adjustment amount corresponding to the cell-specific transport format, taking the PUCCH format 1a as a reference format, and each PUCCH format corresponds to a transmission format adjustment amount. $h(n_{CQI}, n_{HARQ})$ is a PUCCH format correlation degree. $\Delta_{TxD}(F')$ is a related parameter for a transmission port. In this embodiment, each of these parameters is the same for all TTI lengths.

Optionally, the calculation formula of the transmission power may be determined by the TTI length. For example, for a PUSCH or a PUCCH of a TTI less than 1 ms, an offset may be added based on an existing formula, where the offset is determined by a TTI length, such as an offset offset=$\log_{10}(1/x)$. For example, where x is a ratio of the number of symbols included in the TTI less than 1 ms to the number of symbols included in the 1 ms TTI, for example, the TTI corresponding to the TTI of 2 symbols is ⅐. For example, for PUCCH, the existing formula is:

$$P_{PUSCH}(i) = \min\begin{cases} P_{CMAX,c}(i), \\ P_{O\_PUSCH} + PL_c + h(n_{CQI}, n_{HARQ}, n_{SR}) + \\ \Delta_{F\_PUSCH}(F) + \Delta_{TxD}(F') + g(i) \end{cases}$$

Then, the transmission power formula of the PUCCH of the TTI less than 1 ms becomes:

$$P_{PUSCH}(i) = \min\begin{cases} P_{CMAX,c}(i), \\ P_{O\_PUSCH} + PL_c + h(n_{CQI}, n_{HARQ}, n_{SR}) + \\ \Delta_{F\_PUSCH}(F) + \Delta_{TxD}(F') + g(i) + \text{offset} \end{cases}$$

Optionally, the power control parameter of the uplink channel is determined based on a TTI length. For example, $\Delta_{F\_PUCCH}(F)$ is defined with different values for different TTI lengths.

Alternatively, for a channel, such as PUSCH or PUCCH, the eNB may separately configure power parameters for the existing TTI and the TTI less than 1 ms. That is, for PUSCH, the configured parameters include at least one of $P_{O\_NOMINAL\_PUSCH}(j)$, $P_{O\_UE\_PUSCH}(j)$ and $\alpha_c(j)$, and for PUCCH, the configured parameters include at least one of $P_{O\_NOMINAL\_PUCCH}$, $P_{O\_UE\_PUCCH}$ and $\Delta_{F\_PUCCH}(F)$. Alternatively, the adjustment step size of $\delta_{PUSCH,c}$ for the TTI of less than 1 ms may also be different from that of the TTI.

Optionally, for one channel, the eNB may configure a set of parameters for the existing TTI, and configure a set of parameters for all TTI lengths less than 1 ms. For example, for each parameter, a TTI of 2 symbols and a TTI of 4 symbols adopt the same parameter value. That is, for a 1 ms TTI, $P_{O\_NOMINAL\_PUSCH}(j)$, $P_{O\_UE\_PUSCH}(j)$, $\alpha_c(j)$ an MCS-based power control enable parameter and an accumulated power control enable parameter corresponding the 1 ms TTI are configured. For a TTI less than 1 ms, $P_{O\_NOMINAL\_PUSCH}(j)$, $P_{O\_UE\_PUSCH}(j)$, $\alpha_c(j)$, an MCS-based power control enable parameter and an accumulated power control enable parameter are configured. Regardless how many kinds of TTIs less than 1 ms are supported, only the two sets of parameters are configured.

Optionally, for one channel, the eNB may configure a set of parameters for each TTI length, that is, a set of parameters configured for the existing TTI length, a set of parameters for TTI of 2 symbols, and a set of parameters for TTI of 4 symbols. That is, the same number of sets of parameters are configured for the same number of kinds of lengths of the TTIs.

Optionally, for a certain channel, for some parameters, the eNB configures the same for all TTI lengths. That is, for these parameters, the TTI corresponds to the same value. For other parameters, the eNB configures different values for the TTIs. For example, for PUSCH, $P_{O\_NOMINAL\_PUSCH}(j)$, $P_{O\_UE\_PUSCH}(j)$, the MCS-based power control enable parameter and the accumulated power control enable parameter are configured with the same value for all TTI lengths. $\alpha_c(j)$ is configured separately for each TTI length, or one configured for 1 ms TTI, and a common one configured for TTIs less than 1 ms. For PUCCH, each of $P_{O\_NOMINAL\_PUCCH}$, $P_{O\_UE\_PUCCH}$ and $\Delta_{TxD}(F')$ is configured with the same value for all TTI lengths, and $\Delta_{F\_PUCCH}$ (F) may be separately configured according to the TTI length.

Fourth Embodiment

This embodiment provides a method for power control.

Similar to the Third Embodiment, in this embodiment, the UE supports at least two kinds of lengths of TTI, and the length of the TTI may be 1 ms TTI in the existing LTE system, or the TTI includes 2 symbols or 4 symbols or 7 symbols, the 2 symbols or 4 symbols or 7 symbols may be physically continuous or discontinuous. In this embodiment, for the accumulated TPC command, for the TTI of one length, when calculating the power accumulation amount $f_c(i)$, the accumulated power calculation can only be performed by referring to the TTI of that length, rather than referring to the TTI of other lengths. The details will be described below.

For example, assuming that the UE supports two types of lengths of TTIs, one is an existing 1 ms TTI, and the other is a TTI less than 1 ms, such as a TTI of 2 symbols. In this embodiment, a TTI less than 1 ms is called an sTTI. The PUSCH corresponding to the sTTI is called sPUSCH.

For the existing 1 ms TTI, the power accumulation amount $f_c(i)$ is still calculated through the existing accumulation formula, i.e., $$f_c(i)=f_c(i-1)+\delta_{PUSCH,c}(i-K_{PUSCH})$$

$\delta_{PUSCH,c}(i-K_{PUSCH})$ is a power offset amount corresponding to the subframe i, the power offset amount is notified in the TPC command on the subframe $i-K_{PUSCH}$. For a subframe, when the subframe does not have a corresponding TPC command or does not transmit a PUSCH, the $i-K_{PUSCH}$ of the subframe is equal to 0.

Figure 4:
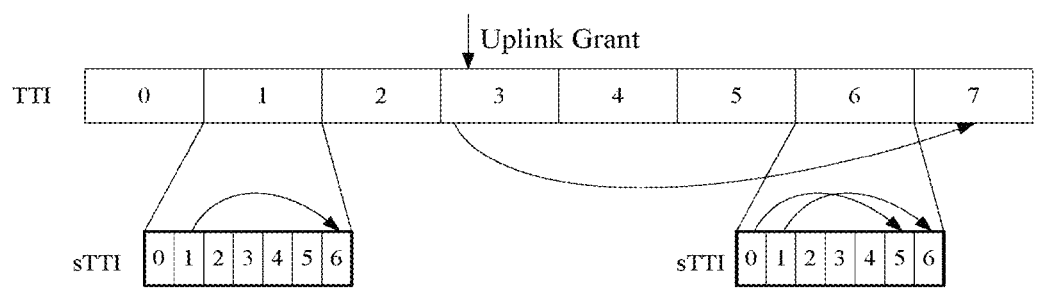
FIG. 4 is a schematic diagram of scheduling a TTI on a subframe according to an embodiment of the present disclosure.

As shown in FIG. 4, there is no PUSCH for scheduling 1 ms TTI on the subframe #6, only sPUSCH is scheduled, so $\delta_{PUSCH,c}=0$, and the power accumulation amount on the subframe #6 is: $f_c(6)=f_c(5)$.

A 1 ms TTI is scheduled on the subframe #7, and its power accumulation amount is referred to the subframe #6, and the power accumulation amount on the subframe #7 is:

$$f_c(7)=f_c(6)+\delta_{PUSCH,c}(i-K_{PUSCH})$$

For a 2-symbol sTTI, if the sTTI is divided, such as a sub-frame divided into 7 sTTIs, the power accumulation amount $f_c(i)$ on sTTI #i can be calculated through an existing accumulated formula.

$$f_c(i)=f_c(i-1)+\delta_{sPUSCH,c}(i-K_{sPUSCH})$$

Where, $K_{sPUSCH}$ is related to the timing between the uplink grant of sTTI and the sPUSCH, such as the sPUSCH on the uplink grant scheduling sTTI #n+4 on the sTTI #n, then $K_{sPUSCH}=4$.

As shown in FIG. 4, only sTTI scheduling is performed on the subframe #1 and subframe #6, and the power accumulation amounts $f_c(i)$ on sTTIs on the subframes #2 to 5 and sTTIs #0 to 4 on the subframe #6 are equal, both of which are equal to the power accumulation amount on sTTI #6 on the subframe #1, and the power accumulation amount on sTTI #5 on the subframe #6 refers to sTTI #4, that is, $$f_c(5)=f_c(4)+\delta_{sPUSCH,c}(i-K_{sPUSCH})$$

If the timing is flexibly configured, $K_{sPUSCH}$ can also be flexible. For example, the value indicated in the DCI of the sPUSCH on sTTI #5 is scheduled to indicate the value of $K_{sPUSCH}$. In this term, $i-K_{sPUSCH}$ corresponds to the subframe which the TPC command corresponding to the sPUSCH on the sTTI #5 is located. $\delta_{sPUSCH,c}(i-K_{sPUSCH})$ corresponds to a value corresponding to the TPC command, for example, +1 dB.

If the sTTI is not divided, but the eNB is flexibly configured, for example, the symbol occupied by the sPUSCH is scheduled by the DCI, the UE may not be able to know the sTTI division on the symbols other than the scheduled sPUSCH. In this case, the above method of referring to sTTI index may not be applicable. However, the above formula can still be employed, i.e., $$f_c(i)=f_c(i-1)+\delta_{sPUSCH,c}(i-K_{sPUSCH})$$

Figure 5:
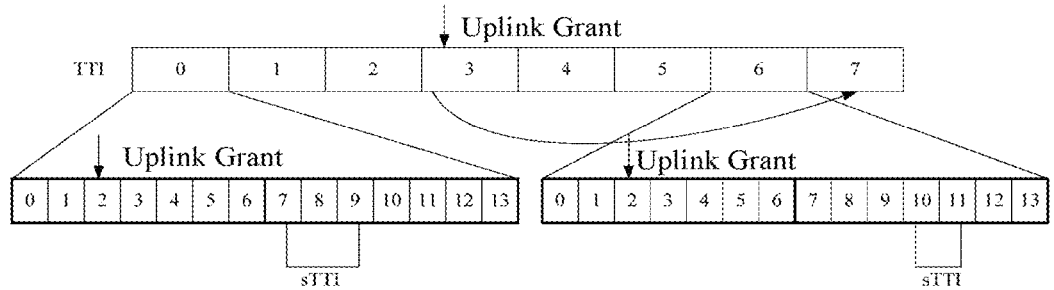
FIG. 5 is a schematic diagram of scheduling a TTI on a subframe according to an embodiment of the present disclosure.

However, the above formula can be understood as follows: i is the sPUSCH transmitted at the i-th time, and the power accumulation amount of the sPUSCH transmitted at the i-th time refers to the power accumulation amount of the sPUSCH transmitted last time. As shown in FIG. 5, the sTTI on the subframe 6 occupies the symbols #10 and 11, and the sPUSCH corresponding to the last scheduling is the symbol #7 and the symbol #9 on the subframe #0, and the sTTI of 2 symbols is discontinuous, then the sTTI on the subframe #6 should refer to the sTTI on the subframe #0.

The method provided in this embodiment can also be applied to more than two TTI lengths.

Figure 11:
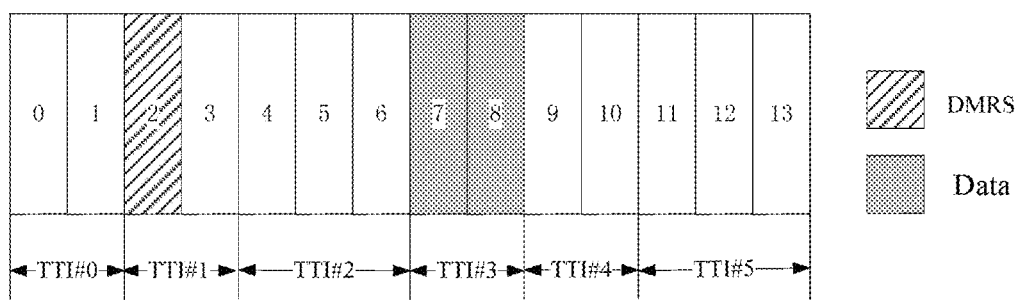
FIG. 11 is a schematic diagram of power accumulation amount of a TTI in which a DMRS is located according to an embodiment of the present disclosure.

The method in this embodiment is also applicable to PUCCH. The method in this embodiment may also be extended to the case where the TTI lengths obtained by the TTI division are not equal. As shown in FIG. 11, one subframe is divided into two-symbol TTIs or three-symbol TTIs. Here, the TTI division may be preset or may be notified by the eNB, such as the eNB notifying a TTI divided pattern.

Then, for the two-symbol TTIs or three-symbol TTIs, the accumulated power amount $f_c(i)$ can only be calculated by referring to the two-symbol TTIs or three-symbol TTIs for calculation of power accumulation amount. The 1 ms TTI may only refer to 1 ms TTI for calculation of power accumulation amount.

For example, as shown in FIG. 11, the power accumulation amount of the sTTI of the first 2 symbols of one subframe is equal to the sum of the power accumulation amount on the sTTI of the last 3 symbols of the previous subframe and the power offset amount of the sTTI of 2 symbols. The power accumulation amount of the subframe #n is equal to the sum of the power accumulation amount of the previous subframe and the power offset amount of the subframe #n.

The methods of the following embodiments can also be extended to the case where the TTI lengths obtained by the TTI division are not equal.

The method in this embodiment can also be described as follows.

When the uplink channel is transmitted on the current TTI with one of multiple TTI lengths, the power accumulation amount is $f=f'+\delta$, where $\delta$ is the power offset on amount the current TTI, the power offset amount is notified is in the TPC command corresponding to the current TTI; and f' is the TTI closest to the current TTI before the current TTI, which has a corresponding TPC command of a length L0. L and L0 belong to the same set. The set is one of:
{2 symbols};
{3 symbols};
{4 symbols};
{7 symbols};
{14 symbols};

{2 symbols, 3 symbols};
{3 symbols, 4 symbols};
{2 symbols, 3 symbols, 7 symbols};
{3 symbols, 4 symbols, 7 symbols};
{2 symbols, 3 symbols, 4 symbols, 7 symbols};

Taking FIG. 2 as an example, the TTI lengths of 2 symbols and of 3 symbols belong to one set.

The definition of the set is also applicable to other embodiments.

Figure 14:
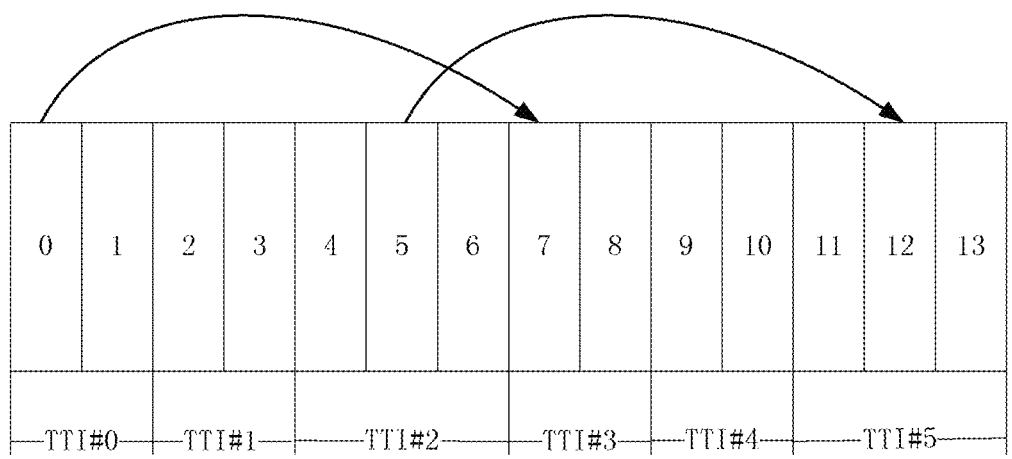
FIG. 14 is a diagram showing power accumulation amount according to an embodiment of the present disclosure.

Taking FIG. 14 as an example, the TPC command corresponding to TTI #5 is at TTI #2, and the TPC command corresponding to TTI #3 is at TTI #0. Then the power offset amount on TTI #5 is equal to the sum of the power accumulation amount on TTI #3 and the power offset amount δ on TTI #5. Here, it should be noted that the PUSCH may or may not be present in TTI #3 or TTI #5. For example, when the DCI of the TPC command on TTI #0 or 3 does not have a corresponding uplink grant, there is no PUSCH, similar to format 3 in the related art.

Fifth Embodiment

This embodiment provides another method for power control.

Similar to the Third Embodiment or the Fourth Embodiment, in this embodiment, the UE supports at least two kinds of lengths of TTI. This embodiment uses two TTI lengths as an example for illustration, however, the method provided in this embodiment is not limited to application for two TTI lengths.

In this embodiment, for the accumulated power control mode, for a TTI of different lengths, when calculating the power accumulation amount $f_c(i)$, a TTI of one length may perform accumulated power calculation with reference to a TTI with a different TTI length.

When the uplink channel is transmitted on the current TTI with one of multiple TTI lengths, the power accumulation amount is $f=f'+\delta$, wherein f' is the power accumulation amount on a designated TTI, the TTI length corresponding to the designated TTI is one of the multiple TTI lengths, δ is the power offset amount on the current TTI, and the power offset amount is notified in the TPC command corresponding to the current TTI.

When condition 1 is satisfied, one of the following establishes:

the designated TTI is the TTI closest to the current TTI;

the designated TTI is one of the multiple TTIs closest to the current TTI;

the designated TTI is the TTI that transmitted the uplink channel at the most recent time;

the designated TTI is one of the multiple TTIs that transmitted the uplink channel at the most recent time;

the designated TTI is the TTI closest to the current TTI before the current TTI, which has the corresponding TPC command. Here, the designated TTI may be transmitted with or without the PUSCH. For example, the TPC command corresponding to the designated TTI is the TPC command indicated in format 3/3A, and no PUSCH is transmitted on the designated TTI; and the designated TTI is one of multiple TTIs closest to the current TTI before the current TTI, which have corresponding TPC commands.

Condition 1 is one of the following:

the TTI in which the TPC command corresponding to the current TTI is located does not transmit an uplink channel before the current TTI; or the TTI in which the TPC command corresponding to the current TTI is located has transmitted an uplink channel before the current TTI, and the TTI in which the TPC command corresponding to the TTI of the transmitted uplink channel is located is before the TTI in which the TPC command corresponding to the current TTI is located.

Alternatively, all of the TTIs from the TTI in which the TPC command corresponding to the current TTI is located to the TTI before the current TTI have no corresponding TPC command.

Here, the designated TTI is the closest to the current TTI, and the distance between the cut-off position of the designated TTI and the start position of the current TTI is the smallest. For example, when the designated TTI is adjacent to the current TTI, the distance between the two is 0, that is, the distance is the smallest.

Figure 6:
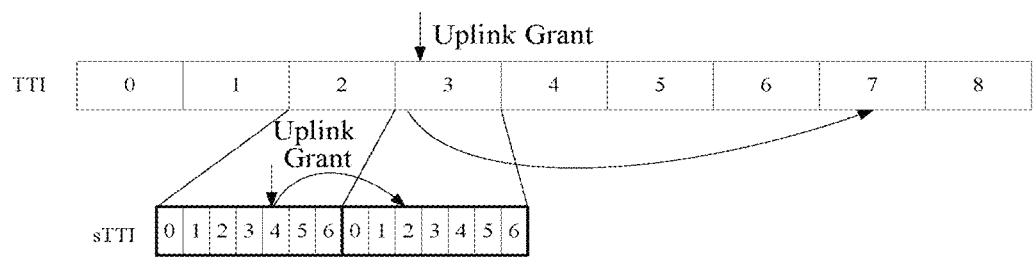
FIG. 6 is a schematic diagram of scheduling a TTI on a subframe according to an embodiment of the present disclosure.

For example, for the subframe #7 in FIG. 6, of the closest two TTIs, that is, the subframe #6 and the last sTTI on the subframe #6, the TTI of the subframe #6 has the largest TTI length. Then the power accumulation amount on the subframe #7 is the sum of the power accumulation amount on the last sTTI on the subframe #6 or the subframe #6 and the power offset amount on the subframe #7.

Alternatively, the designated TTI is the TTIs closest to the current TTI or one of the multiple TTIs closest to the current TTI that meet the following conditions that:

the uplink channel has been transmitted on the designated TTI, and the TTI in which the TPC command corresponding to the designated TTI is located is before the TTI in which the TPC command corresponding to the current TTI is located.

Alternatively, the designated TTI is the previous TTI of the second TTI, and the second TTI is the TTI or one of the multiple TTIs closest to the TTI in which the TPC command corresponding to the current TTI is located, which meets the following conditions that: the uplink channel has been transmitted on the second TTI, and the TTI in which the TPC command corresponding to the second TTI is located is within or after the TTI in which the TPC command corresponding to the current TTI is located.

Alternatively, at the UE side a corresponding TPC command is on the second TTI, and the TTI in which the TPC command is located is within or after the TTI in which the TPC command corresponding to the current TTI is located.

Alternatively, the second TTI is the TTI or one of the multiple TTIs closet to the start position of the TTI in which the TPC command corresponding to the current TTI is located, which meets the following condition that: at The UE side, the uplink channel has been transmitted on the second TTI, and the TTI in which the TPC command corresponding to the second TTI is located is within or after the TTI in which the TPC command corresponding to the current TTI is located.

Alternatively, the designated TTI is the TTI or one of the multiple TTIs closest to the current TTI, which satisfies the following conditions that: the uplink channel has been transmitted on the designated TTI, and the TTI in which the TPC command corresponding to the uplink channel is located is before the TTI in which the TPC command corresponding to the current TTI is located.

As mentioned above, when there are multiple closest TTIs, it is assumed that the multiple TTIs are N TTIs, where N is an integer greater than 1, and the designated TTI is one of the following: the designated TTI is a TTI of a preset length in the multiple TTIs; if one uplink channel has been transmitted at a time corresponding to the first TTI, and the length of the TTI that transmits the uplink channel is L1, then the designated TTI is a TTI having a length of L1 among the N TTIs; in the time corresponding to the first TTI, if N1 uplink channels have been transmitted, the designated TTI is a TTI having a length of L2 among the N TTIs, where L2 is one of the TTI lengths of the N1 uplink channels; in the time corresponding to the first TTI, if one uplink channel has been transmitted, and the length of the TTI that transmits the uplink channel is L1, the designated TTI is a TTI having a length of L3 among the N TTIs, where L1 and L3 belong to the same set; in the time corresponding to the first TTI, if N1 uplink channels have been transmitted, the designated TTI is a TTI having a length of L4 among the N TTIs, where L4 and at least one of the TTI lengths of the N1 uplink channels belong to the same set; in the time corresponding to the first TTI, if a TTI having a length of L5 has a corresponding TPC command, the designated TTI is a TTI having a TTI length of L6 among the N TTIs, where L5 and L6 belong to the same set; and in the time corresponding to the first TTI, if N2 TTIs have corresponding TPC commands, the designated TTI is a TTI having a TTI length of L7 among the N TTIs, where L7 and at least one of the TTI lengths of the N2 TTI belong to the same set; wherein the first TTI is the TTI with the longest TTI length among the N TTIs.

For example, for the subframe #7 in FIG. 6, there are two closest TTIs, that is, the last sTTI on the subframe #6 and the subframe #6. Since sPUSCH is transmitted with a sTTI on the subframe #6, and no 1 ms PUSCH has been transmitted. Then the power accumulation amount on the subframe #7 is the sum of the power accumulation amount on the last sTTI on the subframe #6 and the power offset amount on the subframe #7.

The cutoff symbols of the multiple TTIs described above are the same, as shown in the above example. Alternatively, the transmission times of the multiple TTIs overlap with one another, for example, one subframe is divided into six short TTIs, and the eNB simultaneously schedules the PUSCH on the subframe and a sPUSCH on the third short TTI in the subframe, then the multiple TTIs are the subframe and the third short TTI in the subframe.

This will be specifically described below taking the PUSCH and sPUSCH as an example.

Case 1: it is assumed that the sTTI length is well divided. The following takes 1 ms TTI and sTTI as an example.

If there is no PUSCH and no sPUSCH on the subframe i, then the power accumulation amount on the subframe i is equal to the power accumulation amount on the subframe i−1 or equal to the power accumulation amount of the last sTTI in the previous subframe.

As an implementation, when the subframe i−1 transmits the PUSCH, the power accumulation amount on the subframe i is equal to the power accumulation amount on the subframe i−1; if the sPUSCH is transmitted in the subframe i−1, the power accumulation amount on the frame i is equal to the power accumulation amount of the last sTTI in the subframe i−1; if the subframe i−1 does not transmit the PUSCH and does not transmit the sPUSCH, the power accumulation amount on the subframe i is equal to the power accumulation amount on the subframe i−1 or equal to the power accumulation amount of the last sTTI in the previous subframe.

If there is a PUSCH on the subframe i, and no sPUSCH or PUSCH has been transmitted between the subframe i−k in which the TPC command corresponding to the PUSCH is located and the previous subframe i−1 of the subframe in which the PUSCH is located, or a sPUSCH or a PUSCH has been transmitted, but the sTTI or the subframe in which the TPC command is located is before the subframe i−k, then the power accumulation amount on the subframe i refers to the power accumulation amount on the subframe i−1 or the power accumulation amount of the last sTTI in the subframe i−1.

As an implementation, when the subframe i−1 transmits the PUSCH, the power accumulation amount on the subframe i refers to the power accumulation amount on the subframe i−1; if the sPUSCH is transmitted in the subframe i−1, the power accumulation amount on the frame i refers to the power accumulation amount of the last sTTI in the subframe i−1; if the subframe i−1 transmits neither PUSCH nor sPUSCH, the power accumulation amount on the subframe i refers to the power accumulation amount on the subframe i−1 or the power accumulation amount of the last sTTI in the previous subframe.

If a sPUSCH or a PUSCH has been transmitted between the subframe i−k in which the TPC command corresponding to the PUSCH is located, and the previous subframe i−1 of the subframe in which the PUSCH is located, the power accumulation amount on the subframe i refers to the power accumulation amount of the previous sTTI of the earliest sPUSCH satisfying the first condition, or refers to the power accumulation amount of the previous subframe of the earliest PUSCH satisfying the first condition. Wherein, the first condition is that the TPC command corresponding to the sPUSCH or PUSCH is at the subframe i−k or after the subframe i−k.

For the first sTTI on one subframe, the power accumulation amount on the sTTI refers to the power accumulation amount of the previous subframe, or refers to the power accumulation amount of the last sTTI of the previous subframe.

As an implementation, when the previous subframe has PUSCH transmission, reference is made to the power accumulation amount of the previous subframe; when the previous subframe has sPUSCH transmission, reference is made to the power accumulation amount of the last sTTI of the previous subframe. When there is no PUSCH or sPUSCH transmission in the previous subframe, reference is made to the power accumulation amount of the previous subframe or the power accumulation amount of the last sTTI of the previous subframe.

For an sTTI other than the first sTTI on one subframe, the power accumulation amount on the sTTI is based on the power accumulation amount of the previous sTTI.

In order to facilitate a better understanding of the technical solution of the present disclosure, several specific examples are given below.

As shown in FIG. 6, for the subframe #8, the previous subframe has PUSCH transmission, and the power accumulation amount on the subframe #8 refers to the power accumulation amount on the subframe 7. The subframe #3 schedules the PUSCH on the subframe #7, between the subframe #3 and the subframe #6, a sPUSCH is transmitted on sTTI #2 of the subframe #3, the subframe in which the TPC command corresponding to the sPUSCH on sTTI #2 is located is before the subframe 3, and then the power accumulation amount of the subframe #7 refers to the power accumulation amount of the subframe 6.

Figure 7:
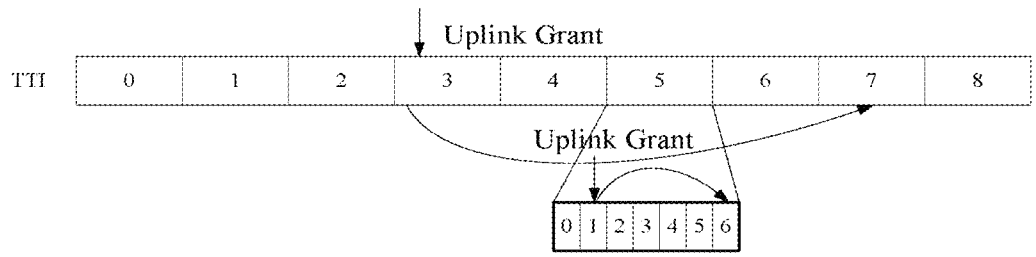
FIG. 7 is a schematic diagram of scheduling a TTI on a subframe according to an embodiment of the present disclosure.

As shown in FIG. 7, the power accumulation amount of the subframe #7 refers to the power accumulation amount of sTTI #5 on the subframe #5.

Case 2: It is assumed that the sTTI length is not divided, the following takes 1 ms TTI and sTTI as an example.

If there is no PUSCH and no sPUSCH on the subframe i, the power accumulation amount on the subframe i is equal to the power accumulation amount on the subframe i−1 or equal to the power accumulation amount corresponding to the sPUSCH transmitted at most recent time.

As an implementation, when the subframe i−1 transmits the PUSCH, the power accumulation amount on the subframe i is equal to the power accumulation amount on the subframe i−1; if the sPUSCH is transmitted in the subframe i−1, the power accumulation amount on the subframe i is equal to the power accumulation amount corresponding to the sPUSCH transmitted at the most recent time; if the subframe i−1 does not transmit a PUSCH and does not transmit a sPUSCH, the power accumulation amount on the subframe i is equal to the power accumulation amount on the subframe i−1 or equal to the power accumulation amount corresponding to the sPUSCH transmitted at the most recent time.

If there is a PUSCH on the subframe i, and no sPUSCH or PUSCH has been transmitted between the subframe i−k in which the TPC command corresponding to the PUSCH is located and the previous subframe i−1 of the subframe in which the PUSCH is located, or a sPUSCH or a PUSCH has been transmitted, but the sTTI or the subframe in which the TPC command is located is before the subframe i−k, then the power accumulation amount on the subframe i refers to the power accumulation amount on the subframe i−1 or refers to the power accumulation amount corresponding to the sPUSCH transmitted at the most recent time.

As an implementation, when the subframe i−1 transmits the PUSCH, the power accumulation amount on the subframe i refers to the power accumulation amount on the subframe i−1; if the sPUSCH is transmitted in the subframe i−1, the power accumulation amount on the subframe i refers to the power accumulation amount corresponding to the sPUSCH transmitted at the most recent time; if the subframe i−1 does not transmit the PUSCH and does not transmit the sPUSCH, the power accumulation amount on the subframe i refers to the power accumulation amount on the subframe i−1 or refers to the power accumulation amount corresponding to the sPUSCH transmitted at the most recent time.

If the sPUSCH or the PUSCH is transmitted between the subframe i−k in which the TPC command corresponding to the PUSCH is located, and the previous subframe i−1 of the subframe in which the PUSCH is located, the power accumulation amount on the subframe i refers to the power accumulation amount of the sPUSCH previously transmitted to the earliest sPUSCH that satisfies the first condition, or, refers to the power accumulation amount of the previous subframe of the earliest PUSCH that satisfies the first condition. Wherein, the first condition is that the TPC command corresponding to the sPUSCH or PUSCH is at the subframe i−k or after the subframe i−k. For the sTTI, the power accumulation amount corresponding to the sPUSCH transmitted this time refers to the power accumulation amount of the sPUSCH transmitted last time.

The method in this embodiment can also be applied to the PUCCH.

Case 3: It is assumed that neither of the two kinds of sTTIs is divided. The first TTI and the second TTI are taken as an example for illustration. For example, the first TTI is a TTI of 4 symbols, and the second TTI is a TTI of 2 symbols.

The power accumulation amount corresponding to the PUSCH of the first TTI or the second TTI that is transmitted this time refers to the designated PUSCH, and the designated PUSCH satisfies the condition that: corresponding TPC command is before the TPC command of the PUSCH and is closest to the designated PUSCH. The designated PUSCH may be a PUSCH of a first TTI or a PUSCH of a second TTI.

Figure 8:
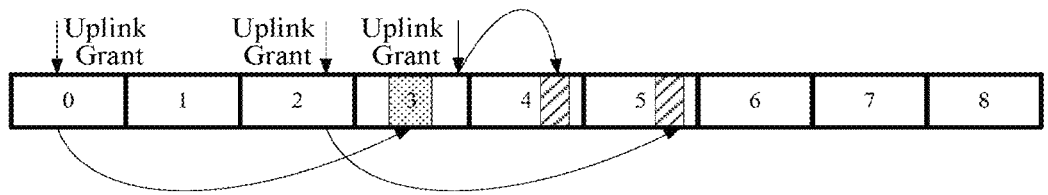
FIG. 8 is a schematic diagram of scheduling a TTI on a subframe according to an embodiment of the present disclosure.

As shown in FIG. 8, the hatched portion is the transmitted 2-symbol PUSCH, the dotted portion is the transmitted 4-symbol PUSCH, and the 2-symbol PUSCH on the subframe #4 is the closest to the 2-symbol PUSCH on the subframe #5, but with a corresponding TPC command after the TPC command of the subframe #5. The PUSCH closest to the 2-symbol PUSCH on the subframe #5 and with a corresponding TPC command before the TPC command of the subframe #5 is the 4-symbol PUSCH on the subframe #3. Then, the power accumulation amount of the 2-symbol PUSCH on the subframe #5 should refer to the power accumulation amount of the 4-symbol PUSCH on the subframe #3.

The method in each case provided in this embodiment can also be applied to other situations and scenarios.

The method in this embodiment may also be extended to the case where the TTI lengths obtained by the TTI division are not equal to one another. For example, the sPUSCH may be considered as a 2 symbol or a 3 symbol sTTI, and the PUSCH is a 1 ms TTI.

Sixth Embodiment

According to another aspect of the present disclosure, the present embodiment provides a method for power control.

Similar to the Third Embodiment or the Fourth Embodiment, in this embodiment, the UE supports at least two kinds of lengths of TTI. This embodiment uses two TTI lengths as an example for illustration, however, the method provided in this embodiment is not limited to application for two TTI lengths.

When the uplink channel is transmitted on the current TTI with one of multiple TTI lengths, the power accumulation amount is f=f'+δ, wherein f' is the power accumulation amount on a designated TTI, the TTI length corresponding to the designated TTI is one of the multiple TTI lengths, δ is the power offset amount on the current TTI, and the power offset amount is notified in the TPC command corresponding to the current TTI.

When condition 1 is satisfied, one of the following establishes: the designated TTI is the TTI closest to the current TTI; the designated TTI is one of the multiple TTIs closest to the current TTI; the designated TTI is the TTI that transmitted the uplink channel at the most recent time; the designated TTI is one of the multiple TTIs that transmitted the uplink channel at the most recent time; the designated TTI is the TTI closest to the current TTI before the current TTI, which has the corresponding TPC command; and the designated TTI is one of multiple TTIs closest to the current TTI before the current TTI, which have corresponding TPC commands.

Alternatively, the designated TTI is the TTIs closest to the current TTI or one of the TTIs closest to the current TTI that meet the following conditions that: the uplink channel has been transmitted on the designated TTI.

Alternatively, the designated TTI has corresponding TPC command.

This will be specifically described below taking the PUSCH and sPUSCH as an example.

In this embodiment, for the accumulated power control mode, for a TTI of different lengths, calculation of the power accumulation amount $f_c(i)$ for a TTI of one length may refer to calculation of the power accumulation amount of a TTI with a different TTI length. The following is a detailed description of the situation.

Case 1: it is assumed that the sTTI length is well divided. The following takes 1 ms TTI and sTTI as an example.

If there is no PUSCH and no sPUSCH on the subframe i, then the power accumulation amount on the subframe i is equal to the power accumulation amount on the subframe i−1 or equal to the power accumulation amount of the last sTTI in the previous subframe.

For a 1 ms TTI, when the subframe i−1 transmits the PUSCH, the power accumulation amount on the subframe i is equal to the power accumulation amount on the subframe i−1; if the sPUSCH is transmitted in the subframe i−1, the power accumulation amount on the frame i is equal to the power accumulation amount of the last sTTI in the subframe i−1; if the subframe i−1 does not transmit the PUSCH and does not transmit the sPUSCH, the power accumulation amount on the subframe i is equal to the power accumulation amount on the subframe i−1 or equal to the power accumulation amount of the last sTTI in the previous subframe.

Regarding the sTTI, for the first sTTI on one subframe, the power accumulation amount on the sTTI refers to the power accumulation amount of the previous subframe, or refers to the power accumulation amount of the last sTTI of the previous subframe.

As an implementation, when the previous subframe has PUSCH transmission, reference is made to the power accumulation amount of the previous subframe; when the previous subframe has sPUSCH transmission, reference is made to the power accumulation amount of the last sTTI of the previous subframe. When there is no PUSCH or sPUSCH transmission in the previous subframe, reference is made to the power accumulation amount of the previous subframe or the power accumulation amount of the last sTTI of the previous subframe.

For an sTTI other than the first sTTI on one subframe, the power accumulation amount on the sTTI is based on the power accumulation amount of the previous sTTI.

Case 2: It is assumed that the sTTI length is not divided, the following takes 1 ms TTI and sTTI as an example.

If there is no PUSCH and no sPUSCH on the subframe i, the power accumulation amount on the subframe i is equal to the power accumulation amount on the subframe i−1 or equal to the power accumulation amount corresponding to the sPUSCH transmitted at most recent time.

As an implementation, when the subframe i−1 transmits the PUSCH, the power accumulation amount on the subframe i is equal to the power accumulation amount on the subframe i−1; if the sPUSCH is transmitted in the subframe i−1, the power accumulation amount on the subframe i is equal to the power accumulation amount corresponding to the sPUSCH transmitted at the most recent time; if the subframe i−1 does not transmit a PUSCH and does not transmit a sPUSCH, the power accumulation amount on the subframe i is equal to the power accumulation amount on the subframe i−1 or equal to the power accumulation amount corresponding to the sPUSCH transmitted at the most recent time.

For the sTTI, the power accumulation amount corresponding to the sPUSCH transmitted this time refers to the power accumulation amount of the sPUSCH transmitted last time.

Case 3: It is assumed that neither of the two kinds of sTTIs is divided. The first TTI and the second TTI are taken as an example for illustration. For example, the first TTI is a TTI of 4 symbols, and the second TTI is a TTI of 2 symbols.

The power accumulation amount corresponding to the PUSCH of the first TTI or the second TTI that is transmitted this time refers to the designated PUSCH transmitted at the most recent time. The PUSCH is closest to the first TTI, and may be the PUSCH of the first TTI or may be the PUSCH of the second TTI.

Figure 9:
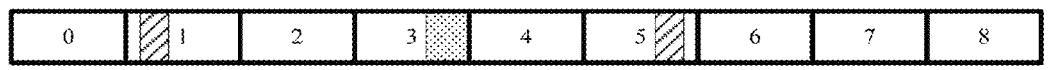
FIG. 9 is a schematic diagram of scheduling a TTI on a subframe according to an embodiment of the present disclosure.

As shown in FIG. 9, the hatched portion is the transmitted 2-symbol PUSCH, the dotted portion is the transmitted 4-symbol PUSCH. Then, the power accumulation amount of the PUSCH on the subframe #5 should refer to the power accumulation amount of the 4-symbol PUSCH on the subframe #3, which is transmitted at the most recent time.

The method in each case provided in this embodiment can also be applied to other situations and scenarios.

The method in this embodiment may also be extended to the case where the TTI lengths obtained by the TTI division are not equal to one another. For example, the sPUSCH may be considered as a 2 symbol or a 3 symbol sTTI, and the PUSCH is a 1 ms TTI.

Seventh Embodiment

According to still another aspect of the present disclosure, a method for determining a transmission power of an SRS is provided in this embodiment.

In the related art, the transmission power of the SRS is calculated based only on the parameters of the PUSCH.

The SRS formula in the related art is:

$$P_{SRS,c}(i) = \min\{P_{CMAX,c}(i), P_{SRS\_OFFSET,c}(m) + 10 \log_{10}(M_{SRS,c}) + P_{O\_PUSCH,c}(j) + \alpha_c(j) \cdot PL_c + f_c(i)\}$$

When the UE supports two or more TTI lengths, this method may cause the real-time performance of the SRS to be deteriorated, especially when sPUSCHs are kept scheduled for a period of time without scheduling a PUSCH. Therefore, the embodiment provides a method for determining the transmission power of the SRS which determines the transmission power of the SRS according to the power control parameter and the power accumulation amount of the PUSCH on the designated TTI, wherein the length of the designated TTI is one of multiple TTI lengths.

The length of the designated TTI is determined according to the time domain and/or frequency domain location of the SRS. For example, the SRS transmitted in the last symbol of the subframe adopts the parameter of the PUSCH of 1 ms, and the SRS transmitted on the other symbols of the subframe adopts the parameter of the sPUSCH. The parameters here include the parameters configured by an upper layer in a semi-static manner and a TPC command. The semi-static parameter include $P_{O\_PUSCH,c}(j)$ and $\alpha_c(j)$, and the TPC command is $f_c(i)$.

The designated TTI is a TTI in which the SRS is located or one of the TTIs in which the SRS is located.

When there are N TTIs in which the SRSs are located, the designated TTI is one of the following: in the time corresponding to the third TTI, if the PUSCH has been transmitted, and the length of the TTI for transmitting the PUSCH is L1, the designated TTI is a TTI with a TTI length of L1 among the N TTIs; in the time corresponding to the third TTI, if the PUSCH has been transmitted, the designated TTI is a TTI in which the TTI length is L2 among the N TTIs, where L2 is one of the TTI lengths of the N1 PUSCHs; in the time corresponding to the third TTI, if the PUSCH has been transmitted, and the length of the TTI for transmitting the PUSCH is L1, the designated TTI is a TTI among the N TTIs of which the TTI length and L1 belong to the same set; a TTI closest to and before a cutoff symbol of the subframe in which the SRS is located, which has a corresponding TPC command; and if the TTI length of the most recently transmitted PUSCH before the SRS is L3, the designated TTI is a TTI among the N TTIs of which the TTI length and L3 belong to the same set; wherein the third TTI is the TTI with the longest TTI length among the N TTIs.

For example, the SRS is transmitted on the subframe #4. If the sPUSCH is transmitted on the subframe #4, but the PUSCH is not transmitted, the power accumulation amount $f_c(i)$ of the SRS is the power accumulation amount on the sTTI in which the SRS is located.

In this embodiment, if the PUSCH is the closest to the SRS transmission time before the SRS transmission time, it is calculated according to the parameters of the PUSCH, for example, $$P_{SRS,c}(i) = \min\{P_{CMAX,c}(i), P_{SRS\_OFFSET,c}(m) + 10 \log_{10}(M_{SRS,c}) + P_{O\_PUSCH,c}(j) + \alpha_c(j) \cdot PL_c + f_c(i)\}$$

Wherein, $P_{O\_PUSCH,c}(j)$, $\alpha_c(j)$, $f_c(i)$, are all substituted for parameters of the PUSCH, where $f_c(i)$ is the power accumulation amount of the closest PUSCH.

If the SRSSCH is the closest to the SRS transmission time before the SRS transmission time, it is calculated according to the parameters of the sPUSCH, that is, the $P_{O\_PUSCH,c}(j)$, $\alpha_c(j)$, $f_c(i)$ in the above formula are all substituted for parameters of the sPUSCH, where $f_c(i)$ is the power accumulation amount of the closest sPUSCH.

Eighth Embodiment

According to still another aspect of the present disclosure, the present embodiment provides a method for reporting a PHR when the UE supports two or more TTI lengths.

Optionally, the PHR is transmitted on the first PUSCH after the triggering, for example, $$PH_{type1,c}(i) = P_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\}$$

$P_{O\_PUSCH,c}(j)$, $\alpha_c(j)$, $\Delta_{TF,c}(i)$ and $f_c(i)$ are all substituted for the parameters of the currently transmitted PUSCH.

Optionally, the PHR is transmitted on the first sPUSCH after the triggering. For example, in the above formula, $P_{O\_PUSCH,c}(j)$, $\alpha_c(j)$, $\Delta_{TF,c}(i)$ and $f_c(i)$ are substituted for the parameters of the currently transmitted sPUSCH.

Optionally, the PHR is transmitted on the first PUSCH or sPUSCH after the triggering.

Optionally, if the transmission time of the PUSCH and the transmission time of the sPUSCH after the triggering overlaps, it is transmitted on the channel with the earlier start symbol; or transmitted on a preset channel, such as PUSCH; or transmitted on both of them.

Ninth Embodiment

This embodiment provides a method for power control.

Similar to the Third Embodiment, in this embodiment, the UE supports at least two lengths of TTI, and the length of the TTI may be 1 ms TTI in the existing LTE system, or the TTI includes 2 symbols or 4 symbols or 7 symbols, and the 2 symbols or 4 symbols or 7 symbols may be physically continuous or discontinuous.

When the UE transmits two PUSCHs, such as PUSCH and sPUSCH, when the TTIs of the PUSCH and the sPUSCH overlap, the maximum value of the PUSCH transmission power is the maximum transmission power of the UE minus the transmission power of the sPUSCH, thus ensuring the transmission of sPUSCH and ensuring the proper reception of the sPUSCH.

That is to say, the formula of the transmission power of the PUSCH is:

$$P_{PUSCH,c}(i) = \min\begin{cases} P_{CMAX,c}(i) - P_{sPUSCH,c}(i), \\ 10\log_{10}(M_{PUSCH,c}(i)) + \\ P_{O\_PUSCH,c}(j) + \alpha_c(j) \cdot PL_c + \Delta_{TF,c}(i) + f_c(i) \end{cases}$$

Tenth Embodiment

This embodiment provides a method for power control.

In this embodiment, the uplink data scheduled for one time and the corresponding DMRS are located in different TTIs. This embodiment provides a method of determining the uplink data and the transmission power of the uplink DMRS.

First Method

The power accumulation amount on the TTI in which the DMRS is located is determined. Here, the power accumulation amount on the TTI in which the DMRS is located may be determined with the method in the foregoing embodiment, and is not limited to the method in the foregoing embodiment. The TTI in which the data is located is equal to the power accumulation amount or the transmission power of the TTI in which the DMRS is located, or has a power offset amount. The power offset amount is preset or notified by the eNB, for example, via SIB or RRC signaling or DCI notification. For example, the transmission power of the TTI in which the data is located is 3 dB greater than the transmission power of the TTI in which the DMRS is located.

For example, for a short TTI scenario, as shown in FIG. 11, 14 symbols in one subframe in the LTE system are divided into 6 TTIs, and the indexes are 0, 1, 2, 3, 4, and 5 respectively. For one scheduling. The DMRS is on the first symbol of TTI #1, i.e. the symbol #2, and the data is on the TTI #3, the symbol 7 and the symbol 8. The power accumulation amount of the TTI in which the DMRS is located is determined by the method in the above embodiment, for example, the power accumulation amount on the TTI #1 is equal to the power accumulation amount on the TTI #0. The power accumulation amount of the TTI #3 where the data is located is equal to the power accumulation amount on the TTI #1 where the DMRS is located, or the transmission power of the data is equal to the transmission power of the DMRS.

As an implementation, when the UE receives at least two uplink grants, and the locations of the DMRSs corresponding to the PUSCHs of the at least two uplink grant scheduling are the same, the UE expects that the power offset amounts included in the at least two uplink grants have the same information.

For example, in FIG. 11, it is assumed that the UE receives three uplink grants, and the TTIs of the corresponding transmission data are TTI #1, 2, and 3, respectively, and the corresponding DMRSs are all on the first symbol of TTI #1, then the UE expects that the power offset amounts included in the three uplink grants have the same information.

Second Method

The power accumulation amount on the TTI in which the data is located is determined. Here, the method in the above embodiment may be used to determine the power accumulation amount on the TTI in which the data is located, and is not limited to the method in the above embodiment. The transmission power of the DMRS is equal to the transmission power of the TTI in which the data is located, or has a power offset amount. Alternatively, the power accumulation amount of the TTI in which the DMRS is located is equal to the power accumulation amount of the TTI in which the data is located, or has a power offset amount. The power offset amount is preset or notified by the eNB As shown in FIG. 11, the power accumulation amount of the TTI in which the DMRS is located is determined by the method in the above embodiment, for example, the power accumulation amount on the TTI #1 is equal to the power accumulation amount on the TTI #0. The power accumulation amount of the TTI #3 where the data is located is equal to the power accumulation amount on the TTI #1 where the DMRS is located, that is, the transmission power of the data is equal to the transmission power of the DMRS.

Preferably, when the UE receives at least two uplink grants, and the locations of the DMRSs corresponding to the PUSCHs of the at least two uplink grants are the same. The UE expects that, except for the designated uplink grant in the at least two uplink grants, the power offset amount in the remaining uplink grant is equal to 0. Here, the designated uplink grant refers to the uplink grant of the at least two uplink grants which corresponds to the earliest data.

For example, in FIG. 11, it is assumed that the UE receives three uplink grants, and the TTIs of the corresponding transmitted data are TTI #1, 2, and 3, respectively, and the corresponding DMRSs are all on the first symbol of TTI #1, then except for the uplink grant of the three uplink grants which corresponds to the TTI #1, the power offset amount in each of the remaining two uplink grants is equal to 0.

Third Method

It is assumed that one subframe in LTE contains multiple TTIs, as shown in FIG. 11, then the power accumulation amounts of all TTIs in the subframe refer to the power accumulation amount on the TTI before the subframe. Similar to the method in the above embodiment, for example, it equals to the sum of the power accumulation amount of the previous subframe of the subframe or of the last sTTI in the previous subframe and the power offset amount of the current TTI, or, equals to the sum of the power accumulation amount of the most recently scheduled PUSCH or sPUSCH before the subframe and the power offset amount of the current TTI, or equals to the sum of the power accumulation amount of the TTI or one of multiple TTIs having the corresponding TPC command for the most recent time and before the subframe and the power offset amount of the current TTI. For example, it is assumed that a subframe contains 6 sTTIs, and the indexes are 0-5, respectively, then the power accumulation amount of the sTTI #k on the subframe n is equal to the sum of the power accumulation amount of the subframe n-1 and the power offset amount corresponding to the sTTI #k, where k belongs to 0-5.

When the UE receives at least two uplink grants for scheduling the UE to transmit in the same subframe, the power offset amounts indicated by the TPC commands in the uplink grants are equal.

For example, if the UE receives three uplink grants for scheduling the UE to transmit on three sTTI on the subframe #4 respectively, the power offset amounts S indicated by the TPC commands in the three uplink grants are equal.

Fourth Method

When the UE receives the uplink grant, and the DMRS is not transmitted in the PUSCH of the uplink grant scheduling, for example, the DMRS is not transmitted in the PUSCH scheduled by the uplink grant indication. Then, the transmission power of the PUSCH is equal to the transmission power of the DMRS that the UE transmitted at the most recent time, or the power accumulation amount of the PUSCH is equal to the power accumulation amount of the TTI in which the DMRS most recently transmitted by the UE is located. The UE expects that the power offset amount indicated in the uplink grant is equal to 0.

Fifth Method

In this method, an uplink grant simultaneously schedules multiple TTIs to be simultaneously transmitted, and the DMRSs are transmitted in a part of the TTIs. Then, the power accumulation amounts of the multiple TTIs are equal, or the transmission powers of the multiple TTIs are equal. The power accumulation amount on the multiple TTIs is equal to the power accumulation amount of the first one of the multiple TTIs.

Eleventh Embodiment

This embodiment provides a reporting method of the PHR.

After the PHR is triggered, when there are at least two PUSCH to be transmitted in one subframe, the designated PUSCH is one of the following:

the PUSCH having the longest length among the at least two PUSCHs;

the PUSCH having the shortest length among the at least two PUSCHs;

the PUSCH on the primary carrier; and the PUSCH with the smallest carrier index of the corresponding secondary carrier or the PUSCH with the largest carrier index of the corresponding secondary carrier.

Or the carrier index of the corresponding subcarrier is a PUSCH of a preset value.

Figure 12:
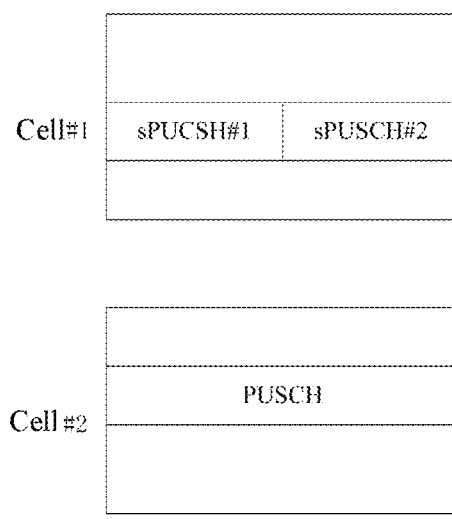
FIG. 12 is a schematic diagram of a cell transmitting a sPUSCH according to an embodiment of the present disclosure.

As shown in FIG. 12, there are two cells in total. The first cell has a TTI length of 0.5 ms, two sPUSCHs have been transmitted, and the second cell has a TTI length of 1 ms, and one PUSCH had been transmitted. Then the PHR can be transmitted on the PUSCH.

Preferably, when there are multiple PUSCHs that satisfy one of the above conditions, they may be transmitted on the first PUSCH or on the last PUSCH. Here, the first PUSCH refers to the transmission of the earliest PUSCH, and the last one refers to the transmission of the latest PUSCH.

The following is how the PHR is reported.

Optionally, on the designated carrier, if PUSCHS are transmitted within a designated time period, the PHR is obtained according to one of the PUSCHs; otherwise, the PHR is obtained according to the case where no PUSCH has been transmitted. The start position of the designated time period is equal to or later than the start of the start symbol of the designated PUSCH, and the cutoff position is equal to or earlier than the end of the end symbol of the designated PUSCH. The designated PUSCH is a PUSCH including a PHR. The designated time period is a subset of the transmission time corresponding to the designated PUSCH. For example, the designated PUSCH is one subframe, and the designated time period may be several symbols included in the subframe.

The designated time period includes one of the following:

the start position of the designated time period is the start of the start symbol of the designated PUSCH, and the cutoff position is one of the following:

the first k symbols within the transmission time corresponding to the designated PUSCH;

the first TTI within the transmission time corresponding to the designated PUSCH, where the TTI is a TTI corresponding to the designated carrier, where k is a positive integer.

As an example, it is assumed that the designated time period is as shown in FIG. 12, and the PHR is transmitted on the PUSCH of the cell #2. It is assumed that the designated time period is the first TTI in the subframe in which the PUSCH is transmitted. Then, for the cell #1, the sPUSCH is transmitted on the first TTI, and then the PHR can be obtained according to the sPUSCH. That is to say, the parameters corresponding to sPUSCH #1 are substituted into the PHR formula. That is, the power headroom corresponding to the sPUSCH is calculated. For example, it can be similar to the existing formula, such as:

Type 1 report:

$$PH_{type1,c}(i)=P_{CMAX,c}(i)-\{10\ \log_{10}(M_{PUSCH,c}(i))+ P_{O\_PUSCH,c}(j)+\alpha_c(j)\cdot PL_c+\Delta_{TF,c}(i)+f_c(i)\}[dB]$$

Type 2 report:

$$PH_{type2}(i) = P_{CMAX,c}(i) - 10\log_{10}$$

$$\left(10^{(\log_{10}(M_{PUSCH,c}(i))+P_{O\_PUSCH,c}(j)+\alpha_c(j)PL_c+\Delta_{TF,c}(i)+f_c(i))/10} + 10^{(P_{O\_PUSCH}+PL_c+g(i))/10}\right)[dB]$$

If the cell #1 does not transmit the PUSCH on the first TTI, the PHR can be obtained according to the case where the PUSCH is not transmitted, that is, the formula when the PUSCH is not transmitted is brought into the PHR formula, for example, the existing formula can be used, and the Type1 PHR is reported.

Type 1 report:

$$PH_{type1,c}(i)=\tilde{P}_{CMAX,c}(i)-\{P_{O\_PUSCH,c}(1)+\alpha_c(1)\cdot PL_c+f_c(i)\}[dB]$$

Type2 report:

$$PH_{type1,c}(i)=\tilde{P}_{CMAX,c}(i)-\{P_{O\_PUSCH,c}(1)+\alpha_c(1)\cdot PL_c+f_c(i)\}[dB]$$

When multiple PUSCHs are transmitted in a designated time period, the PHR is obtained by using one of the PUSCHs, for example, the first PUSCH in the PUSCH, or the last PUSCH, or the k-th PUSCH, where k is a preset or notified by the eNB.

On the designated carrier, if PUCCHs have been transmitted within a designated time period, the PHR is obtained according to one of the PUCCHs; otherwise, the PHR is obtained according to the case where no PUCCH has been transmitted.

If no PUCCH has been transmitted on the designated carrier, or a PUCCH has been transmitted, but the TTI length of the PUCCH is shorter than the TTI length of the designated PUSCH, the PHR is obtained according to the case where no PUCCH has been transmitted.

Figure 13:
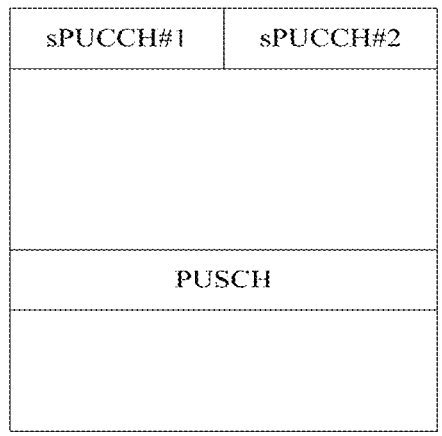
FIG. 13 is a schematic diagram of transmission a PUSCH and a sPUCCH according to an embodiment of the present disclosure.

For example, within one carrier, if there is a PUSCH and an sPUCCH are transmitted, where the PUSCH contains the PHR. As shown in FIG. 13, then, similar to the above, if a sPUCCH has been transmitted within the designated time period, the PHR is obtained according to the situation where there is a sPUCCH that has been transmitted, for example, as in the existing formula:

For type 1 report, it is:

$$PH_{type1,c}(i)=\tilde{P}_{CMAX,c}(i)-\{10\ \log_{10}(M_{PUSCH,c}(i))+P_{O\_PUSCH,c}(j)+\alpha_c(j)\cdot PL_c+\Delta_{TF,c}(i)+f_c(i)\}[dB]$$

For type 2 report, it is:

$$PH_{type2}(i) = P_{CMAX,c}(i) - 10\log_{10}$$

$$\left(10^{(\log_{10}(M_{PUSCH,c}(i))+P_{O\_PUSCH,c}(j)+\alpha_c(j)PL_c+\Delta_{TF,c}(i)+f_c(i))/10} + 10^{(P_{O\_PUSCH}+PL_c+h(n_{CQI},n_{HARQ},n_{SR})+\Delta_{F\_PUSCH}(F)+\Delta_{TxD}(F')+g(i))/10}\right)[dB]$$

If the sPUCCH has been transmitted within the designated time period, then according to the situation where there is a sPUCCH that has been transmitted, for example, for type 1 report, it is:

$$PH_{type1,c}(i)=\tilde{P}_{CMAX,c}(i)-\{10\ \log_{10}(M_{PUSCH,c}(i))+P_{O\_PUSCH,c}(j)+\alpha_c(j)\cdot PL_c+\Delta_{TF,c}(i)+f_c(i)\}[dB]$$

for type 2 report, it is:

$$PH_{type2}(i) = P_{CMAX,c}(i) - 10\log_{10}$$

$$\left(10^{(\log_{10}(M_{PUSCH,c}(i))+P_{O\_PUSCH,c}(j)+\alpha_c(j)PL_c+\Delta_{TF,c}(i)+f_c(i))/10} + 10^{(P_{O\_PUSCH}+PL_c+g(i))/10}\right)[dB]$$

Alternatively, $$PH_{type2}(i) = P_{CMAX,c}(i) - 10\log_{10}$$

$$\left(10^{(P_{O\_PUSCH,c}(1)+\alpha_c(1)PL_c+f_c(i))/10} + 10^{(P_{O\_PUSCH}+PL_c+h(n_{CQI},n_{HARQ},n_{SR})+\Delta_{F\_PUSCH}(F)+\Delta_{TxD}(F')+g(i))/10}\right)[dB]$$

It is similar for multiple carrier transmissions.

Twelfth Embodiment

This embodiment provides a method for power control.

The power accumulation amount of the current subframe is the sum of the power accumulation amount of the previous subframe of the current subframe and the power offset amount of the current subframe.

The power accumulation amount of the current subframe is the sum of the power accumulation amount of the last short TTI in the previous subframe of the current subframe and the power offset amount of the current subframe.

The power accumulation amount of the first short TTI in the current subframe is the sum of the power accumulation amount of the previous subframe of the current subframe and the power offset amount of the first short TTI in the current subframe.

The power accumulation amount of the first short TTI in the current subframe is the sum of the power accumulation amount of the last short TTI in the previous subframe of the current subframe and the power offset amount of the first short TTI in the current subframe.

The TTI length of the short TTI is less than one subframe. For example, it is 2 symbols or 3 symbols or 4 symbols or 7 symbols.

When the previous subframe of the current subframe transmits the PUSCH, or when the previous subframe of the current subframe has a corresponding TPC command, then one of the following establishes:

the power accumulation amount of the current subframe is the sum of the power accumulation amount of the previous subframe of the current subframe and the power offset amount of the current subframe; and the power accumulation amount of the first short TTI in the current subframe is the sum of the power accumulation amount of the previous subframe of the current subframe and the power offset amount of the first short TTI in the current subframe.

The PUSCH is a PUSCH corresponding to the current subframe. It should be noted that the PUSCH refers to the existing PUSCH, and the transmission time may be one subframe, such as 14 symbols when the conventional CP is used, or 13 symbols, for example, the last symbol is used to transmit the SRS.

When a PUSCH has been transmitted on at least one short TTI in a previous subframe of the current subframe, or when there is a corresponding TPC command on at least one short TTI in a previous subframe of the current subframe, then one of the following establishes:

the power accumulation amount of the current subframe is the sum of the power accumulation amount of the last short TTI of a previous subframe of the current subframe and a power offset amount of a first short TTI in the current subframe; and the power accumulation amount of the first short TTI in the current subframe is the sum of the power accumulation amount of the last short TTI of the previous subframe of the current subframe and the power offset amount of the first short TTI of the current subframe.

The PUSCH is a PUSCH corresponding to the short TTI

Thirteenth Embodiment

This embodiment provides a method for power control.

In the related art, DCI format 3/3A is a TPC command common to multiple UEs. For the FDD system, the UE receives the DCI format 3/3A in the subframe #n, then the power accumulation amount of the subframe n+4 is equal to the sum of the power accumulation amount of the subframe n+3 and the power offset amount indicated by the TPC command included in DCI format 3/3A. For a system with a short TTI, the power offset amount indicated by the TPC command included in the DCI format 3/3A is also used for the first short TTI of the subframe n+4, that is, the TPC command corresponding to the first short TTI on the subframe n+4 is also the power offset amount indicated in DCI format 3/3A on subframe #n.

Fourteenth Embodiment

In all the embodiments of the present disclosure, for a TTI whose TTI length is less than one subframe, that is, a TTI in the related art, the TTI length may include both a symbol for transmitting a DMRS and a symbol for transmitting data, or may only include a symbol for transmitting data. For example, it is assumed that 7 symbols in one slot are sequentially divided into TTI #1 of 2 symbols, TTI #2 of 2 symbols, and TTI #3 of 3 symbols in time order, then, when the DMRS of the PUSCH in the TTI #2 is transmitted in the TTI #1, although the PUSCH transmits a total of three symbols at this time, it is considered that the TTI length is still two symbols.

In all embodiments of the present disclosure, all TTIs in one TTI dividing manner can be considered to be one TTI length. As shown in FIG. 11, one subframe is divided into six TTIs, TTI #0, 1, 3, and 4 each contains two symbols, and TTI #2 and 5 each contains three symbols, then, in the dividing manner, the TTI length of all the TTIs is 2 symbols.

Through the description of the above embodiments, those skilled in the art can clearly understand that the method according to the above embodiment can be implemented by means of software in conjunction with a necessary general hardware platform, and of course, by hardware, but in many cases, the former is a better implementation. Based on such understanding, the technical solution of the present disclosure, which is essential or contributes to the related art, may be embodied in the form of a software product stored in a storage medium (such as ROM/RAM, a disk, an optical disc) including a number of instructions for causing a terminal device (which may be a cell phone, a computer, a server, or a network device, etc.) to perform the method described in various embodiments of the present disclosure.

In the embodiment, an uplink power control apparatus is further provided, which is used to implement the foregoing embodiments and preferred implementations, and description that has already been made will not be repeated. As used below, the term "module" may implement a combination of software and/or hardware of a predetermined function. Although the apparatus described in the following embodiments are preferably implemented in software, hardware, or a combination of software and hardware, is also possible and contemplated.

Figure 10:
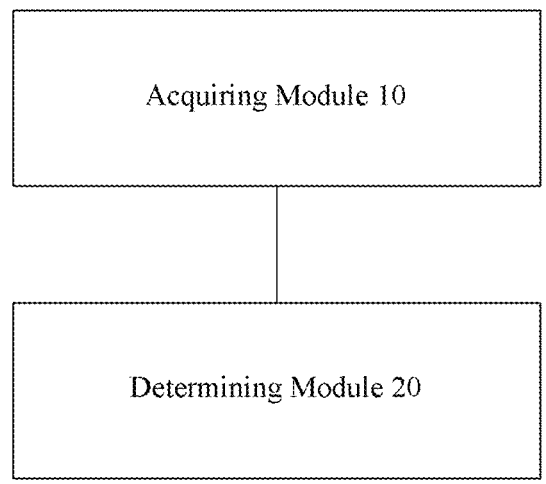
FIG. 10 is a structural block diagram of an uplink power control apparatus according to an embodiment of the present disclosure.

FIG. 10 is a structural block diagram of an uplink power control apparatus according to an embodiment of the present disclosure. As shown in FIG. 10, the apparatus includes an acquiring module 10 configured to, when an uplink channel is transmitted with one of multiple TTI lengths, or an uplink channel is transmitted with one of multiple timings, acquire a power control parameter; and a determining module 20 configured to determine a transmission power of the uplink channel according to the power control parameter, wherein the uplink channel is a PUSCH or a PUCCH.

It should be noted that each of the above modules may be implemented by software or hardware. For the latter, the foregoing may be implemented in a manner, but not limited to that, the foregoing modules are all located in the same processor; or, the modules are distributed in multiple processors respectively.

An embodiment of the present disclosure also provides a computer readable storage medium configured to store program codes for performing the steps in the embodiments described above.

In this embodiment, the storage medium may include, but not limited to, a U disk, a Read-Only Memory (ROM), a Random Access Memory (RAM), a mobile hard disk, a magnetic disk, or an optical disk, and a variety of media that can store program codes.

It will be apparent to those skilled in the art that the various modules or steps of the present disclosure described above can be implemented by a general-purpose computing device that can be centralized on a single computing device or distributed across a network of multiple computing devices. Alternatively, they may be implemented by program codes executable by the computing device such that they may be stored in the storage device by the computing device and, in some cases, may be performed in an order different from the order described or illustrated herein. Alternatively, they may be separately fabricated into individual integrated circuit modules, or multiple modules or steps thereof are fabricated as a single integrated circuit module. Thus, the present disclosure is not limited to any specific combination of hardware and software.

The above description is only the preferred embodiment of the present disclosure, and is not intended to limit the present disclosure, and various modifications and alterations can be made to the present disclosure. Any modifications, equivalent substitutions, improvements, etc. made within the spirit and scope of the present disclosure are intended to be included within the scope of the present disclosure.

INDUSTRIAL APPLICABILITY

According to the present disclosure, when an uplink channel is transmitted with one of multiple TTI lengths, or an uplink channel is transmitted with one of multiple timings, a transmission power of the uplink channel is determined according to the power control parameter. It can solve the problem of uplink power control for a short TTI in the related art.

The invention claimed is:

1. An uplink power control method, comprising:
   acquiring, by a User Equipment (UE) side, a power control parameter, when an uplink channel is transmitted with one of multiple Transmission Time Interval (TTI) lengths, or an uplink channel is transmitted with one of multiple timings; and
   determining a transmission power of the uplink channel according to the power control parameter, wherein the uplink channel is a Physical Uplink Shared Channel (PUSCH) or a Physical Uplink Control Channel (PUCCH);
   wherein when only a Demodulation Reference Signal (DMRS) corresponding to the uplink channel is transmitted on a fourth TTI, and data corresponding to the uplink channel is transmitted on a TTI other than the fourth TTI, at least one of the following establishes:
   the power accumulation amount on the TTI in which the data is located is equal to the power accumulation amount on the fourth TTI, or has a power offset from the power accumulation amount on the fourth TTI;
   the power accumulation amount on the TTI in which the data is located is equal to the power accumulation amount corresponding to the DMRS, or has a power offset from the power accumulation amount corresponding to the DMRS; and
   the transmission power of the data is equal to the transmission power of the DMRS, or has a power offset from the transmission power of the DMRS.

2. The method according to claim 1, wherein
   when the uplink channel is transmitted on a TTI with an index i using one of the multiple timings, k, the power accumulation amount is $f(i)=f(i-m)+\delta$, where $f(i-m)$ is a power accumulation amount on a TTI with an index i−m, $\delta$ is a power offset amount on the TTI with the index i, the power offset amount is notified in a TPC command corresponding to the TTI with the index i, and a TTI in which the TPC command is located is a TTI with an index i−k.

3. The method according to claim 2, wherein the TTI with the index i−m is a TTI closest to the TTI with the index i among all TTIs satisfying any one of conditions that:
   no said uplink channel has been transmitted on the TTI with the index i−m;
   the uplink channel has been transmitted on the TTI with the index i−m, and the uplink channel has been transmitted with the timing k of the multiple timings; or
   wherein the TTI with the index i−m is a TTI closest to the TTI with the index i among all TTIs satisfying any one of conditions that:
   no said uplink channel has been transmitted on the TTI with the index i−m;
   the uplink channel has been transmitted on the TTI with the index i−m, and the TTI in which the TPC command corresponding to the TTI with the index i−m is located is before the TTI with the index i−k.

4. The method according to claim 1, wherein the power control parameters is the same for all TTI lengths.

5. The method according to claim 4, wherein for PUSCH, the power control parameters comprise at least one of:
   a cell-specific power parameter of the PUSCH, Po_nominal;
   a UE-specific power parameter of the PUSCH, Po_UE;
   a path-loss compensation coefficient of the PUSCH, alpha;
   a Modulation and Coding Scheme (MCS)-based power control enable parameter; and
   an accumulated power control enable parameter.

6. The method according to claim 1, wherein the power control parameter comprises a first power control parameter and a second power control parameter, wherein the first power control parameter is the same for all TTI lengths, and the second power control parameter is respectively configured according to the TTI length.

7. The method according to claim 6, wherein the second power control parameter is separately configured according to a TTI length, comprising one of that:
   the second power control parameter is separately configured for each TTI length; and
   the second power control parameter is configured separately for a TTI length of 1 ms and a TTI length of less than 1 ms.

8. The method according to claim 1, wherein
   wherein—when the uplink channel is transmitted on a current TTI with one of multiple TTI lengths, the power accumulation amount is $f=f'+\delta$, where $f'$ and $\delta$ satisfying one of the following groups of definition,
   group one: where $f'$ is a power accumulation amount corresponding to the uplink channel with a TTI length L which was transmitted at the most recent time before the current TTI, $\delta$ is a power offset amount on the current TTI, where the power offset amount is notified in a TPC command corresponding to the current TTI;
   group two: $\delta$ is a power offset amount on the current TTI, and the power offset amount is notified in a TPC command corresponding to the current TTI, where $f'$ is a power accumulation amount corresponding to the uplink channel with a TTI length L0 that was transmitted at the most recent time before the current TTI; or, $f'$ is a TTI with a length L0 which has a corresponding TPC command and is closest to the current TTI before the current TTI, where L0 and L belong to a same set;
   group three: $f'$ is a power accumulation amount on a designated TTI, and a TTI length corresponding to the designated TTI is one of the multiple TTI lengths, $\delta$ is a power offset amount on the current TTI, and the power offset amount is notified in a TPC command corresponding to the current TTI.

9. The method according to claim 8, wherein the designated TTI is one of:
   the designated TTI is the TTI closest to the current TTI;
   the designated TTI is one of multiple TTIs that are closest to the current TTI;
   the designated TTI is the TTI that transmitted the uplink channel at the most recent time;
   the designated TTI is one of multiple TTIs that transmitted the uplink channel at the most recent time;
   the designated TTI is the TTI closest to the current TTI before the current TTI, which has the corresponding TPC command;
   the designated TTI is one of multiple TTIs closest to the current TTI before the current TTI, which have corresponding TPC commands;

the designated TTI is the TTI closest to the fifth TTI before the fifth TTI;

the designated TTI is one of multiple TTIs that are closest to the fifth TTI;

the designated TTI is the TTI closest to the fifth TTI before the fifth TTI, which has the corresponding TPC command;

the designated TTI is one of multiple TTIs closest to the fifth TTI before the fifth TTI, which have corresponding TPC commands; and the fifth TTI overlaps with the current TTI in time, and the TTI length of the fifth TTI is greater than the TTI length of the current TTI.

10. The method according to claim 2, wherein, for one TTI, when no PUSCH is transmitted on the TTI or there is no corresponding TPC command or is not an uplink subframe, the power offset amount δ corresponding to the TTI=0.

11. The method according to claim 8, wherein, for one TTI, when no PUSCH is transmitted on the TTI or there is no corresponding TPC command or is not an uplink subframe, the power offset amount δ corresponding to the TTI=0.

12. An uplink power control method, comprising:

sending, by a base station side, a power control parameter to a UE side, when an uplink channel is transmitted with one of multiple TTI lengths, or an uplink channel is transmitted with one of multiple timings;

wherein the power control parameter is used for determining a transmission power of the uplink channel, and the uplink channel is a Physical Uplink Share Channel (PUSCH) or a Physical Uplink Control Channel (PUCCH);

wherein when only a Demodulation Reference Signal (DMRS) corresponding to the uplink channel is transmitted on a fourth TTI, and data corresponding to the uplink channel is transmitted on a TTI other than the fourth TTI, at least one of the following establishes:

a power accumulation amount on the another TTI is equal to the power accumulation amount on the TTI only transmitting the DMRS corresponding to the uplink channel;

the power accumulation amount on the another TTI is equal to the power accumulation amount corresponding to the DMRS; and the transmission power of the data is equal to the transmission power of the DMRS.

13. An uplink power control apparatus, comprising:

a processor; and a non-transitory computer-readable storage medium for storing instructions which, when executed by the processor, cause the processor to perform a method comprising:

acquiring, when an uplink channel is transmitted with one of multiple TTI lengths, or an uplink channel is transmitted with one of multiple timings, acquire a power control parameter; and determining a transmission power of the uplink channel according to the power control parameter, wherein the uplink channel is a Physical Uplink Share Channel (PUSCH) or a Physical Uplink Control Channel (PUCCH);

wherein when only a Demodulation Reference Signal (DMRS) corresponding to the uplink channel is transmitted on a TTI, and data corresponding to the uplink channel is transmitted on another TTI, at least one of the following establishes:

a power accumulation amount on the another TTI is equal to the power accumulation amount on the TTI only transmitting the DMRS corresponding to the uplink channel;

the power accumulation amount on the another TTI is equal to the power accumulation amount corresponding to the DMRS; and the transmission power of the data is equal to the transmission power of the DMRS.

14. The apparatus according to claim 13, wherein when the uplink channel is transmitted on a TTI with an index i using one of the multiple timings, k, a power accumulation amount is $f(i)=f(i-m)+\delta$, wheref $(i-m)$ is a power accumulation amount on a TTI with an index $i-m$, δ is a power offset amount on the TTI with the index i, the power offset amount is notified in a Transmit Power Control (TPC) command corresponding to the TTI with the index i, and a TTI in which the TPC command is located is a TTI with an index $i-k$.

15. The apparatus according to claim 14, wherein the TTI with the index $i-m$ is a TTI closest to the TTI with the index i among all TTIs satisfying any one of conditions that:

no said uplink channel has been transmitted on the TTI with the index $i-m$;

the uplink channel has been transmitted on the TTI with the index $i-m$, and the uplink channel has been transmitted with the timing k of the multiple timings; or wherein the TTI with the index $i-m$ is a TTI closest to the TTI with the index i among all TTIs satisfying any one of conditions that:

no said uplink channel has been transmitted on the TTI with the index $i-m$;

the uplink channel has been transmitted on the TTI with the index $i-m$, and the TTI in which the TPC command corresponding to the TTI with the index $i-m$ is located is before the TTI with the index $i-k$.

* * * * *

UNITED STATES PATENT AND TRADEMARK OFFICE
CERTIFICATE OF CORRECTION

PATENT NO.       : 11,284,353 B2
APPLICATION NO.  : 16/325048
DATED            : March 22, 2022
INVENTOR(S)      : Wen Zhang et al.

Page 1 of 3

It is certified that error appears in the above-identified patent and that said Letters Patent is hereby corrected as shown below:

In the Specification

Column 3, Line 20, the formula reading:
- f(i)=f(i–1)+8 -
Should read:
-- $f(i) = f(i-1) + \delta$ --

Column 3, Line 22:
- (is a power offset amount on the TTI with the -
Should read:
-- $\delta$ is a power offset amount on the TTI with --

Column 3, Line 30, the formula reading:
- f(i)=f(i–1)+8 -
Should read:
-- $f(i) = f(i-1) + \delta$ --

Column 15, Line 50, the formula reading:

$$P_{PUSCH}(i) = \min \begin{cases} P_{CMAX,c}(i), \\ P_{O\_PUSCH} + PL_c + h(n_{CQI}, n_{HARQ}, n_{SR}) + \\ \Delta_{F\_PUSCH}(F) + \Delta_{TxD}(F') + g(i) + \text{offset} \end{cases}$$

Should read:

$$P_{PUCCH}(i) = \min \begin{cases} P_{CMAX,c}(i), \\ P_{0\_PUCCH} + PL_c + h(n_{CQI}, n_{HARQ}, n_{SR}) + \Delta_{F\_PUCCH}(F) + \Delta_{TxD}(F') + g(i) + \mathit{offset} \end{cases}$$

Signed and Sealed this
Twentieth Day of September, 2022

*Katherine Kelly Vidal*

Katherine Kelly Vidal
*Director of the United States Patent and Trademark Office*

CERTIFICATE OF CORRECTION (continued)

Column 16, Line 10, the formula reading:

$$P_{PUSCH}(i) = \min\begin{cases} P_{CMAX,c}(i), \\ P_{O\_PUSCH} + PL_c + h(n_{CQI}, n_{HARQ}, n_{SR}) + \\ \Delta_{F\_PUSCH}(F) + \Delta_{TxD}(F') + g(i) \end{cases}$$

Should read:

$$P_{PUCCH}(i) = \min\begin{cases} P_{CMAX,c}(i), \\ P_{0\_PUCCH} + PL_c + h(n_{CQI}, n_{HARQ}, n_{SR}) + \Delta_{F\_PUCCH}(F) + \Delta_{TxD}(F') + g(i) \end{cases}$$

Column 16, Line 20, the formula reading:

$$P_{PUSCH}(i) = \min\begin{cases} P_{CMAX,c}(i), \\ P_{O\_PUSCH} + PL_c + h(n_{CQI}, n_{HARQ}, n_{SR}) + \\ \Delta_{F\_PUSCH}(F) + \Delta_{TxD}(F') + g(i) + \text{offset} \end{cases}$$

Should read:

$$P_{PUCCH}(i) = \min\begin{cases} P_{CMAX,c}(i), \\ P_{0\_PUCCH} + PL_c + h(n_{CQI}, n_{HARQ}, n_{SR}) + \Delta_{F\_PUCCH}(F) + \Delta_{TxD}(F') + g(i) + \textit{offset} \end{cases}$$

Column 31, Line 19, the formula reading:

$$PH_{type2}(i) = P_{CMAX,c}(i) - 10\log_{10}\begin{pmatrix} 10^{(\log_{10}(M_{PUSCH,c}(i)) + P_{O\_PUSCH,c}(j) + \alpha_c(j)\cdot PL_c + \Delta_{TF,c}(i) + f_c(i))/10} + \\ 10^{(P_{O\_PUSCH} + PL_c + g(i))/10} \end{pmatrix} [dB]$$

Should read:

$$PH_{type2}(i) = P_{CMAX,c}(i) - 10\log_{10}\begin{pmatrix} 10^{(10\log_{10}(M_{PUSCH,c}(i)) + P_{O\_PUSCH,c}(j) + \alpha_c(j)\cdot PL_c + \Delta_{TF,c}(i) + f_c(i))/10} \\ + 10^{(P_{0\_PUCCH} + PL_c + g(i))/10} \end{pmatrix} [dB]$$

Column 32, Line 2, the formula reading:

$$PH_{type2}(i) = P_{CMAX,c}(i) - 10\log_{10}\begin{pmatrix} 10^{(\log_{10}(M_{PUSCH,c}(i)) + P_{O\_PUSCH,c}(j) + \alpha_c(j)\cdot PL_c + \Delta_{TF,c}(i) + f_c(i))/10} + \\ 10^{(P_{O\_PUSCH} + PL_c + h(n_{CQI}, n_{HARQ}, n_{SR}) + \Delta_{F\_PUSCH}(F) + \Delta_{TxD}(F') + g(i))/10} \end{pmatrix} [dB]$$

Should read:

$$PH_{type2}(i) = P_{CMAX,c}(i) - 10\log_{10}\begin{pmatrix} 10^{(10\log_{10}(M_{PUSCH,c}(i)) + P_{O\_PUSCH,c}(j) + \alpha_c(j)\cdot PL_c + \Delta_{TF,c}(i) + f_c(i))/10} \\ + 10^{(P_{0\_PUCCH} + PL_c + h(n_{CQI}, n_{HARQ}, n_{SR}) + \Delta_{F\_PUCCH}(F) + \Delta_{TxD}(F') + g(i))/10} \end{pmatrix} [dB]$$

CERTIFICATE OF CORRECTION (continued)
U.S. Pat. No. 11,284,353 B2

Column 32, Line 18, the formula reading:

$$PH_{type2}(i) = P_{CMAX,c}(i) - 10\log_{10}\left(\begin{array}{l}10^{(\log_{10}(M_{PUSCH,c}(i))+P_{O\_PUSCH,c}(j)+\alpha_c(j)PL_c+\Delta_{TF,c}(i)+f_c(i))/10} + \\ 10^{(P_{O\_PUSCH}+PL_c+g(i))/10}\end{array}\right)[dB]$$

Should read:

$$PH_{\text{type2}}(i) = P_{\text{CMAX},c}(i) - 10\log_{10}\left(\begin{array}{l}10^{(10\log_{10}(M_{\text{PUSCH},c}(i))+P_{0\_\text{PUSCH},c}(j)+\alpha_c(j)\cdot PL_c+\Delta_{\text{TF},c}(i)+f_c(i))/10} \\ + 10^{(P_{0\_\text{PUCCH}}+PL_c+g(i))/10}\end{array}\right)[dB]$$

Column 32, Line 26, the formula reading:

$$PH_{type2}(i) = P_{CMAX,c}(i) - 10\log_{10}\left(\begin{array}{l}10^{(P_{O\_PUSCH,c}(1)+\alpha_c(1)PL_c+f_c(i))/10} + \\ 10^{(P_{O\_PUSCH}+PL_c+h(n_{CQI},n_{HARQ},n_{SR})+\Delta_{F\_PUSCH}(F)+\Delta_{TxD}(F')+g(i))/10}\end{array}\right)[dB]$$

Should read:

$$PH_{\text{type2}}(i) = P_{\text{CMAX},c}(i) - 10\log_{10}\left(\begin{array}{l}10^{(P_{0\_\text{PUSCH},c}(1)+\alpha_c(1)\cdot PL_c+f_c(i))/10} \\ + 10^{(P_{0\_\text{PUCCH}}+PL_c+h(n_{CQI},n_{HARQ},n_{SR})+\Delta_{F\_\text{PUCCH}}(F)+\Delta_{TxD}(F')+g(i))/10}\end{array}\right)[dB]$$